United States Patent
Muikaichi

(10) Patent No.: US 8,428,437 B2
(45) Date of Patent: Apr. 23, 2013

(54) REPRODUCTION DEVICE, INTEGRATED CIRCUIT, REPRODUCTION METHOD, PROGRAM, AND COMPUTER-READABLE RECORDING MEDIUM

(75) Inventor: Masahiro Muikaichi, Osaka (JP)

(73) Assignee: Panasonic Corporation, Osaka (JP)

( * ) Notice: Subject to any disclaimer, the term of this patent is extended or adjusted under 35 U.S.C. 154(b) by 333 days.

(21) Appl. No.: 12/746,844

(22) PCT Filed: Feb. 13, 2009

(86) PCT No.: PCT/JP2009/000579
§ 371 (c)(1),
(2), (4) Date: Jun. 14, 2010

(87) PCT Pub. No.: WO2009/101819
PCT Pub. Date: Aug. 20, 2009

(65) Prior Publication Data
US 2011/0116763 A1     May 19, 2011

(30) Foreign Application Priority Data
Feb. 14, 2008   (JP) .................................. 2008-032837

(51) Int. Cl.
*H04N 9/70* (2006.01)
(52) U.S. Cl.
USPC ............................ 386/300; 386/239; 386/302
(58) Field of Classification Search .................. None
See application file for complete search history.

(56) References Cited

U.S. PATENT DOCUMENTS

| | | | |
|---|---|---|---|
| 2005/0018486 A1 | 1/2005 | Kawai | |
| 2005/0168483 A1* | 8/2005 | Hirata | 345/629 |
| 2005/0191035 A1 | 9/2005 | Jung et al. | |
| 2005/0213942 A1 | 9/2005 | Seo et al. | |
| 2005/0259286 A1* | 11/2005 | Iwaki | 358/1.9 |
| 2007/0172199 A1 | 7/2007 | Kobayashi et al. | |
| 2007/0223332 A1* | 9/2007 | Fujinami et al. | 369/47.22 |
| 2008/0062314 A1* | 3/2008 | Yoo et al. | 348/468 |
| 2009/0006990 A1* | 1/2009 | Ossesia | 715/763 |

FOREIGN PATENT DOCUMENTS

| | | |
|---|---|---|
| JP | 2005-25819 | 1/2005 |
| JP | 2005-258139 | 9/2005 |
| JP | 2005-269595 | 9/2005 |
| JP | 2007-27990 | 2/2007 |
| JP | 2007-525904 | 9/2007 |
| JP | 2007-259121 | 10/2007 |
| JP | 2007-531195 | 11/2007 |

OTHER PUBLICATIONS

International Search Report issued Mar. 17, 2009 in International (PCT) Application No. PCT/JP2009/000579.

\* cited by examiner

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

A playback device for updating a character string in synchronization with a moving image displays a gradation character using an available index in a color lookup table. The playback device includes a pre-analysis unit that pre-analyzes character-string display instruction information in a text subtitle stream, thereby recognizing in advance the available index in the color lookup table and displaying the gradation character using the available index.

9 Claims, 22 Drawing Sheets

FIG. 10A

Used index management table

| Character color index | 0 | 2 | ...... | } Used indexes in index use continuation period |
|---|---|---|---|---|
| Background color index | 1 | 3 | ...... | } Available indexes in index use continuation period |

FIG. 10B

Gradation color management table

| Character color index | Background color index | Gradation color index |
|---|---|---|
| 0 | 1 | 16 17 |
| 2 | 3 | 18 19 |
| ... | ... | ... |

FIG. 10C

Color lookup table

| Index | Color information (R, G, B) |
|---|---|
| 0 | (r0, g0, b0) |
| 1 | (r1, g1, b1) |
| 2 | (r2, g2, b2) |
| 3 | (r3, g3, b3) |
| ... | ... |

FIG. 10D

Color lookup table

| Index | Color information (R, G, B) |
|---|---|
| 0 | (r0, g0, b0) |
| 1 | (r1, g1, b1) |
| 2 | (r2, g2, b2) |
| 3 | (r3, g3, b3) |
| ... | ... |
| 16 | (r16, g16, b16) |
| 17 | (r17, g17, b17) |
| 18 | (r18, g18, b18) |
| 19 | (r19, g19, b19) |

FIG. 11A

Gradation color display
using 2-bit pixel values

| Pixel value | |
|---|---|
| 0 | Background color |
| 1 | } Gradation colors |
| 2 | |
| 3 | Character color |

FIG. 11B

Gradation color display
using 4-bit pixel values

| Pixel value | |
|---|---|
| 0 | Background color |
| 1 | |
| 2 | |
| ⋮ | } Gradation colors |
| 14 | |
| 15 | Character color |

FIG. 11C

| Maximum number of gradation indexes | Number of gradation color indexes |
|---|---|
| 0 or more and less than 2 | 0 |
| 2 or more and less than 6 | 2 |
| 6 or more and less than 14 | 6 |
| 14 or more | 14 |

FIG. 12

Pixel code pattern representing gradation character

| 00 | 00 | 00 | 00 | 00 | 00 | 00 | 00 | 00 | 10 | 00 | 00 | 00 | 00 | 00 | 00 | 00 | 00 |
|----|----|----|----|----|----|----|----|----|----|----|----|----|----|----|----|----|----|
| 00 | 00 | 00 | 00 | 00 | 00 | 00 | 10 | A0 | FF | A0 | 00 | 00 | 00 | 00 | 00 | 00 | 00 |
| 00 | 00 | 00 | 00 | 00 | 00 | 00 | 10 | FF | FF | FF | 10 | 00 | 00 | 00 | 00 | 00 | 00 |
| 00 | 00 | 00 | 00 | 00 | 00 | 40 | 10 | FF | 20 | FF | FF | B0 | 00 | 00 | 00 | 00 | 00 |
| 00 | 00 | 00 | 00 | 00 | 60 | B0 | 90 | FF | 00 | FF | FF | 80 | 00 | 00 | 00 | 00 | 00 |
| 00 | 00 | 00 | 00 | 00 | 10 | FF | FF | 00 | 00 | 70 | 20 | FF | 80 | 00 | 00 | 00 | 00 |
| 00 | 00 | 00 | 00 | 70 | A0 | FF | 10 | 00 | 00 | 00 | A0 | FF | A0 | 30 | 00 | 00 | 00 |
| 00 | 00 | 00 | 00 | 90 | FF | FF | FF | 70 | D0 | E0 | FF | FF | FF | B0 | 00 | 00 | 00 |
| 00 | 00 | 00 | 10 | A0 | FF | FF | A0 | 10 | A0 | A0 | 10 | A0 | FF | FF | 00 | 00 | 00 |
| 00 | 00 | 00 | 30 | FF | FF | A0 | 70 | 00 | 00 | 00 | 08 | FF | FF | A0 | 10 | 00 | 00 |
| 00 | 00 | 40 | E0 | FF | E0 | 30 | 00 | 00 | 00 | 00 | 00 | 90 | FF | 80 | 10 | 00 | 00 |
| 00 | 00 | 50 | D0 | FF | 70 | 00 | 00 | 00 | 00 | 00 | 00 | A0 | FF | A0 | 60 | 00 | 00 |
| 00 | 10 | 60 | FF | 80 | C0 | 00 | 00 | 00 | 00 | 00 | 00 | 10 | FF | FF | 90 | 70 | 00 |
| 00 | 80 | A0 | FF | B0 | 80 | 00 | 00 | 00 | 00 | 00 | 00 | E0 | FF | FF | A0 | 10 | 00 |
| 00 | B0 | FF | FF | D0 | 00 | 00 | 00 | 00 | 00 | 00 | 00 | 00 | A0 | FF | A0 | 10 | 00 |

FF:Character color index
00:Background color index
10~E0:Gradation color index
Maximum number of gradation colors:14

Gradation character

■ Character color
☐ Background color
▩▨▧ Gradation color

FIG. 21A
Normal color management table

| Index | Color information (α, R, G, B) | Physical index |
|---|---|---|
| 0 | (α0, r0, g0, b0) | 3 |
| 1 | (α1, r1, g1, b1) | 8 |
| 2 | (α2, r2, g2, b2) | 2 |
| 3 | (α3, r3, g3, b3) | 4 |
| ... | | |
| 254 | (α254, r254, g254, b254) | - |
| 255 | (α255, r255, g255, b255) | - |

FIG. 21B
Display area management table

| Area | Character color index | Background color index |
|---|---|---|
| Area 1 | 0 | 1 |
| Area 2 | 2 | 3 |
| | 4 | 5 |

FIG. 21C
Gradation color management table

| Character color index | Background color index | Color information (α, R, G, B) | Physical index |
|---|---|---|---|
| 0 | 1 | (αa0, ra0, ga0, ba0)<br>(αa1, ra1, ga1, ba1)<br>(αa2, ra2, ga2, ba2) | 10<br>11<br>12 |
| 2 | 3 | ... | |
| 4 | 5 | | |

FIG. 21D
Color lookup table

| Physical index | Color information (α, R, G, B) |
|---|---|
| 0 | (α0, r0, g0, b0) |
| 1 | (α1, r1, g1, b1) |
| 2 | (α2, r2, g2, b2) |
| 3 | (α3, r3, g3, b3) |
| ... | ... |
| 255 | (α255, r255, g255, b255) |

REPRODUCTION DEVICE, INTEGRATED CIRCUIT, REPRODUCTION METHOD, PROGRAM, AND COMPUTER-READABLE RECORDING MEDIUM

TECHNICAL FIELD

The present invention relates to a technique for displaying text subtitles.

BACKGROUND ART

Text subtitle display is a technique for displaying subtitles represented by text codes, in synchronization with pictures in a movie. This is one of the techniques unique to BD-ROM (Blu-ray Disc Read Only Memory) playback devices.

BD-ROM playback devices expand text codes constituting subtitles into bitmap with use of a font, and display the bitmap in synchronization with pictures in a video stream.

The following describes a conventional subtitle display technique. When figures and characters are displayed by a display apparatus such as a household television monitor, display data for each pixel is stored in a frame memory. Here, if each pixel holds color information such as $\alpha$, R, G, and B values, the size of the frame memory increases. Suppose that each pixel holds color information indicating $\alpha$, R, G, and B values, where each value is one byte. In this case, a 4-byte memory is required for each pixel. To avoid this situation, a color lookup table is used to reduce the size of the frame memory. The color lookup table shows, for each pixel, a correspondence between (i) an index value to be stored in the frame memory and (ii) color information. Since the color lookup table shows a correspondence between index values and color information, each pixel only holds an index value. The index values are converted into color information to display images, with reference to the color lookup table. In this way, each pixel in the frame memory only holds an index value. Therefore, in a case where the number of colors simultaneously displayable on a screen is 256 (i.e., $2^8$), a 1-byte index value is assigned to one pixel, allowing a memory necessary for one pixel to be only one byte. In this way, using the color lookup table enables a reduction in the size of the frame memory of the playback device.

Such a technique for assigning the display colors of characters is disclosed, for example, in Patent Literature 1.

CITATION LIST

Patent Literature

[Patent Literature 1]
Japanese Patent Application Publication No. 2005-258139

SUMMARY OF INVENTION

Technical Problem

However, in a conventional technique for playing back a text subtitle stream, characters are displayed by expanding an outline font. Therefore, notable jaggies are observed on the outlines of characters depending on the size of the characters, thus deteriorating quality in subtitles as compared to those displayed in bitmap.

In order to make the jaggies less notable, subtitle characters may be displayed by means of gradation display. The gradation display is a technique for displaying characters with use of a character color and a background color and also an intermediate color created based on the character color and the background color. This allows colors to be smoothly changed between characters and a background, eliminating jaggies appearing along an edge between the characters and the background. According to the conventional technique described in Patent Literature 1, when the gradation display is performed, multi-gradation character data is generated and displayed with use of an available index in the color lookup table.

Specifically, an available index in the color lookup table is automatically used as a gradation color index, so that the color lookup table shows a correspondence between the gradation color index and a pair of a character color index and a background color index. Then, the color information of the gradation color index is updated, and the color lookup table is stored in a color lookup table storage unit. Subsequently, a gradation character is rendered into a frame memory with use of the gradation color index.

In a text subtitle stream, however, the use status of indexes in the color lookup table greatly changes in the course of playback of a video stream. For this reason, it is inconvenient to employ the aforementioned gradation display without modification. The change in the use status of indexes is caused by a plurality of pieces of character-string display instruction information in the text subtitle stream. Specifically, in playback of text subtitles, a playback device displays subtitles with use of one of the pieces of character-string display instruction information that corresponds to a current playback time point in the video stream. Some of the pieces of character-string display instruction information instruct the playback device to update the color lookup table used for color conversion when displaying characters. If a gradation color is arbitrarily assigned to an index for gradation display, a conflict arises between the gradation display and the character-string display instruction information over the use of indexes. For example, assume that the playback device automatically assigns a gradation color to an available index, and thereafter assigns a different color to the same index in accordance with the character-string display instruction information. In this case, the gradation color may be displayed in a color different from a color that is supposed to be displayed. In other words, the gradation color may be displayed in an inappropriate color indicated by the color information that is assigned to the index based on the character-string display instruction information.

To avoid the aforementioned problem, indexes used for the text subtitle stream may be analyzed in advance so as to assign a gradation color to an index other than the indexes used for the text subtitle stream. However, if a gradation color is assigned to an index not used in any section of the text subtitle stream, the number of indexes selectable for gradation colors decreases, resulting in the number of colors usable for displaying the gradation colors being insufficient. In this case, it is impossible to ensure sufficient gradations for the gradation display, thus failing to improve the quality of subtitle characters.

An aim of the present invention is to provide a playback device that ensures sufficient gradation colors for gradation display, while avoiding a conflict with an update of a color lookup table based on character-string display instruction information.

Solution to Problem

In order to solve the above problems, one aspect of the present invention is a playback device for playing back a subtitle stream in synchronization with a video stream, the playback device comprising: a video decoder operable to decode the video stream; a subtitle decoder operable to decode the subtitle stream to obtain a bitmap of a subtitle; and a color conversion unit operable to convert bit values of the bitmap into display colors based on a color lookup table, the display colors including a character color, a background color, and one or more gradation colors for gradation therebetween, and the color lookup table including pieces of color information corresponding one-to-one to indexes of the bit values, wherein prior to the conversion, the subtitle decoder detects a period on a time axis of the video stream, in which a pair of an index corresponding to a piece of color information of the character color and an index corresponding to a piece of color information of the background color is continuously used, and updates the color lookup table by assigning a piece of color information of each gradation color to one of the indexes that is other than the indexes used in the period.

Advantageous Effects of Invention

According to the stated structure of the present invention, the subtitle decoder of the playback device detects in advance a period in which a pair of an index corresponding to a piece of color information of the character color and an index corresponding to a piece of color information of the background color is continuously used. Then, the subtitle decoder assigns a piece of color information of each gradation color to one of the indexes that is other than the indexes used in the period. This eliminates a conflict between the use of indexes for displaying the character color and the background color and the use of indexes for displaying gradation colors during the period, preventing the aforementioned problem of displaying an inappropriate color.

A display period indicated by the display instructions in the subtitle stream is divided by a unit of time called "index use continuation period". Then, a gradation color is assigned to an available index (i.e., index not being used) in each index use continuation period. This prevents an extreme decrease in the number of indexes usable for the gradation display. By avoiding a conflict over the use of indexes within a restricted time period (i.e., index use continuation period), a gradation color is displayed in an appropriate color. As a result, sufficient number of gradation colors is ensured, realizing a high-quality gradation display. With the realization of the gradation display, text subtitles having a quality as excellent as bitmap subtitles are provided to be played back in synchronization with a video stream.

Pre-analyzing all display instructions may cause detriment. For example, the duration of time before initially displaying a character string may become longer. However, the aforementioned playback device avoids such detriment by dividing the range of pre-analysis by time points at which all display areas are updated. In this way, a time period in which all the display areas are updated is set to be the range of pre-analysis, thus shortening the duration of time before initially displaying a character string. This enables a high-speed gradation display using a large number of colors.

Furthermore, according to the present invention, a large number colors are usable for gradation characters. Therefore, colors are changed smoothly between subtitle characters and a background in an eye-friendly manner, even when the subtitle characters are enlarged in accordance with the display instruction or an instruction by a user. In other words, even when the subtitle characters are enlarged to an arbitrary size, jaggies along the edge between the subtitle characters and the background are eliminated with use of the gradation display, realizing user-friendly subtitle display.

BRIEF DESCRIPTION OF DRAWINGS

FIGS. 10A, 10B, 10C, and 10D each show one example of how to create a gradation color management table.

FIGS. 11A, 11B, and 11C each schematically show how to determine the number of gradations.

FIG. 12 shows one example of a pixel code pattern indicating a gradation character.

FIGS. 21A, 21B, 21C, and 21D each show a normal color management table, a display area management table, a gradation color management table, and a color lookup table, respectively.

REFERENCE SIGNS LIST

Figure 1:
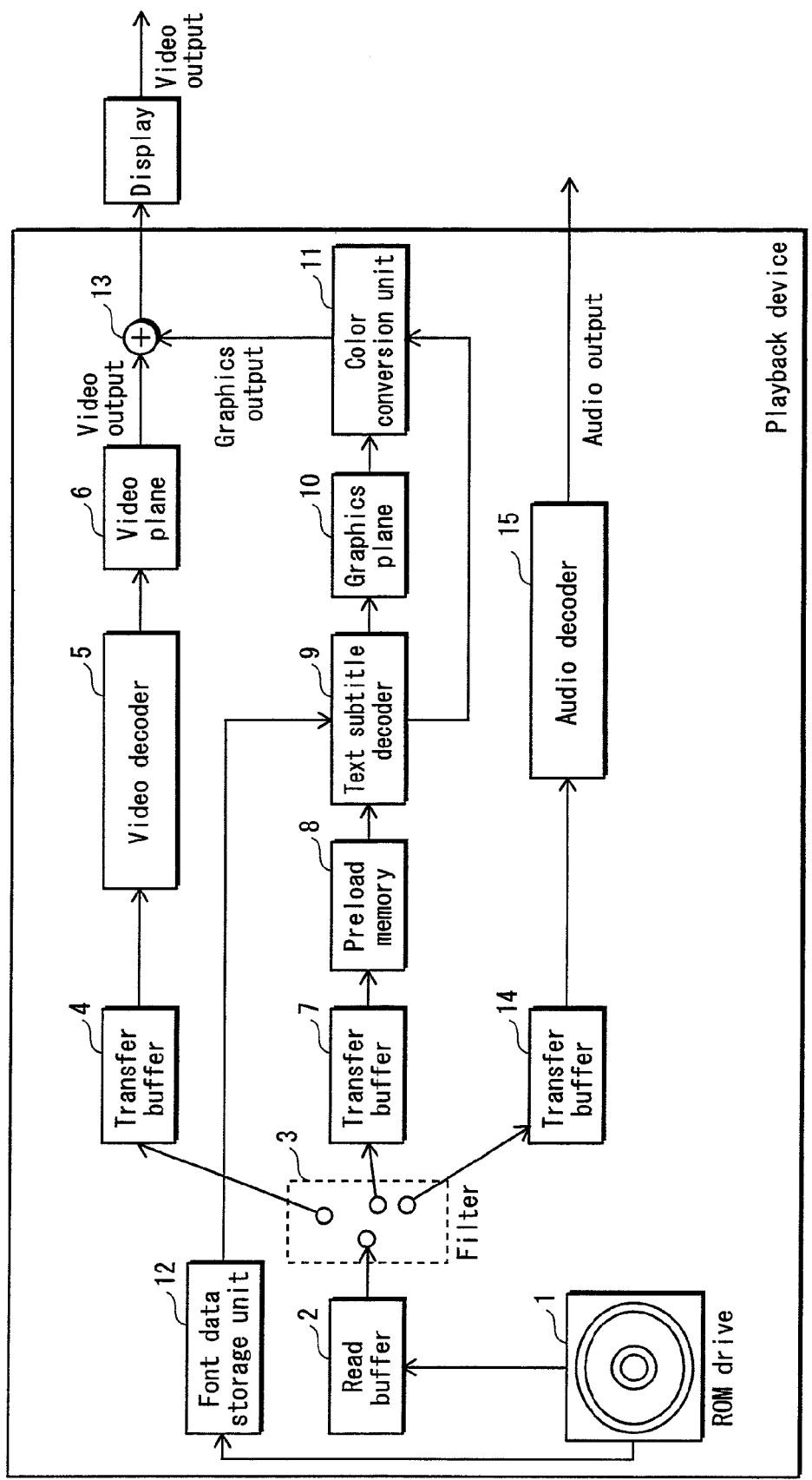
FIG. 1 shows a structure of a playback device according to Embodiment 1.

| 1 | ROM drive |
| 2 | Read buffer |
| 3 | Filter |
| 4 | Transfer buffer |
| 5 | Video decoder |

-continued

| | |
|---|---|
| 6 | Video memory |
| 8 | Preload memory |
| 9 | Text subtitle decoder |
| 10 | Graphics plane |
| 11 | Color conversion unit |
| 12 | Font data storage unit |
| 13 | Composition unit |
| 14 | Transfer buffer |
| 15 | Audio decoder |
| 21 | Character-string display instruction analysis unit |
| 22 | Pre-analysis unit |
| 23 | Color lookup table control unit |
| 24 | Rendering control unit |
| 25 | Rendering unit |
| 31 | Normal color management unit |
| 32 | Display area management unit |
| 33 | Gradation color management unit |
| 34 | Physical index management unit |

DESCRIPTION OF EMBODIMENTS (1) The following describes an embodiment of a playback device including means to solve the aforementioned problem, with reference to the drawings.

<Embodiment 1>

Described first is an outline of processing by a playback device according to Embodiment 1.

The playback device plays back an AV stream in synchronization with a text subtitle stream, according to playlist information. The AV stream includes a video stream and an audio stream multiplexed therein. The text subtitle stream is not multiplexed into the AV stream. The text subtitle stream is stored in a file different from a file that stores the AV stream, and is recorded onto a BD-ROM.

The following describes the playlist information. The playlist information includes at least one piece of playback section information. Each piece of the playback section information includes (i) information indicating the file name of AV stream management information corresponding to the AV stream, (ii) information indicating the playback start point and the playback end point of the AV stream, and (iii) a stream number table. The playlist information, the AV stream, and the text subtitle stream are collectively referred to as a content or simply referred to as "playlist" on the BD-ROM.

The stream number table indicates one or more text subtitle streams playable in synchronization with the AV stream, and includes the language code of the text subtitle stream. Also, the AV stream management information lists a font identifier.

The playback device judges whether any of the one or more text subtitle streams indicated by the stream number table in the playback section information included in the playlist information satisfies the following three conditions. When judging affirmatively, the playback device selects one of the text subtitle streams judged to satisfy the conditions.

Meanwhile, the playback device reads, from the BD-ROM, font data indicated by the font identifier in the AV stream management information, and preloads the font data into a memory thereof, prior to the playback of the AV stream based on the playback section information.

The following are the three conditions for a text subtitle stream to be selected.

The first condition is that the playback device is capable of expanding text codes constituting the text subtitle stream into pixel codes having a two-dimensional pattern, with use of a font.

The second condition is that the playback device is capable of realizing a display method (e.g., vertical writing, kerning, ruby, word wrap, etc.) unique to a language corresponding to the language code of the text subtitle stream.

The third condition is that the language code of the text subtitle stream matches the language setting of the playback device. A text subtitle stream satisfying these three conditions is suitable to be displayed as text subtitles. Therefore, the text code of the text subtitle stream is expanded with use of font data, and played back in synchronization with the AV stream.

FIG. 1 is a block diagram showing an internal structure of the playback device according to Embodiment 1. As shown in FIG. 1, the playback device includes a ROM drive 1, a read buffer 2, a filter 3, a transfer buffer 4, a video decoder 5, a video plane 6, a transfer buffer 7, a preload memory 8, a text subtitle decoder 9, a graphics plane 10, a color conversion unit 11, a font data storage unit 12, a composition unit 13, a transfer buffer 14, and an audio decoder 15. Here, the text subtitle decoder 9 is a character-string display device.

The ROM drive 1 accesses the BD-ROM. For example, the ROM drive 1 loads, reads, and ejects the BD-ROM.

The read buffer 2 stores TS packets read by the ROM drive 1.

The filter 3 outputs TS packets constituting a video stream to the transfer buffer 4, upon receiving the TS packets from the read buffer 2.

The transfer buffer 4 stores the TS packets constituting the video stream, upon receiving the TS packets from the filter 3.

The video decoder 5 decodes video data stored in the transfer buffer 4, and writes uncompressed video data into the video plane 6.

The video plane 6 is a frame memory that stores the uncompressed video data.

The transfer buffer 7 stores TS packets constituting a text subtitle stream output from the filter 3.

The preload memory 8 is a buffer that stores the text subtitle stream in advance before playback of the first playlist.

The text subtitle decoder 9 decodes data stored in the preload memory 8. The text subtitle decoder 9 also writes subtitle characters into the graphics plane 10, and sets a color lookup table in the color conversion unit 11.

The graphics plane 10 has the area of one screen, and stores therein the subtitle characters. Pixels in the graphics plane 10 are represented by pixel codes. Here, the "pixel codes" are 4-bit, 1-byte, and 2-byte codes that can be expanded into color information with reference to the color lookup table. Values that the pixel codes may take are referred to as "pixel values", and are indicated by indexes to which color information is assigned in the color lookup table. The subtitle characters stored in the graphics plane 10 are represented by a two-dimensional pattern of the pixel codes. The subtitle characters represented by using the pixel codes of gradation colors are referred to as "gradation characters".

The color conversion 11 stores the color lookup table, and converts the pixel codes into pieces of color information with use of the color lookup table. The color lookup table indicates the correspondence between index values and pieces of color information. The color information may indicate transparency $\alpha$, brightness Y, a red color difference Cr, and a blue color difference Cb. Alternatively, the color information may indicate transparency a, red brightness R, green brightness G, and blue brightness B. Hereinafter, the color information is assumed to indicate a combination of transparency, red brightness, green brightness, and blue brightness (denoted as "$\alpha$, R, G, and B"), for the sake of convenience.

The font data storage unit 12 is a buffer that stores font data read from the ROM drive 1. As with the case of the preload memory 8, the font data is stored in advance before playback of the first playlist.

The composition unit 13 composites a video output with a graphics output to obtain a resultant image, and outputs the resultant image on a display external to the playback device. The video output is data output from the video plane 6. The graphics output is image data obtained by converting graphics data stored in the graphics plane 10 with use of an index value stored in the graphics plane 10 and the color lookup table stored in the color conversion unit 11.

The transfer buffer 14 stores TS packets constituting an audio stream output from the filter 3.

The audio decoder 15 decodes audio data stored in the transfer buffer 4, and outputs uncompressed audio data.

Figure 2:
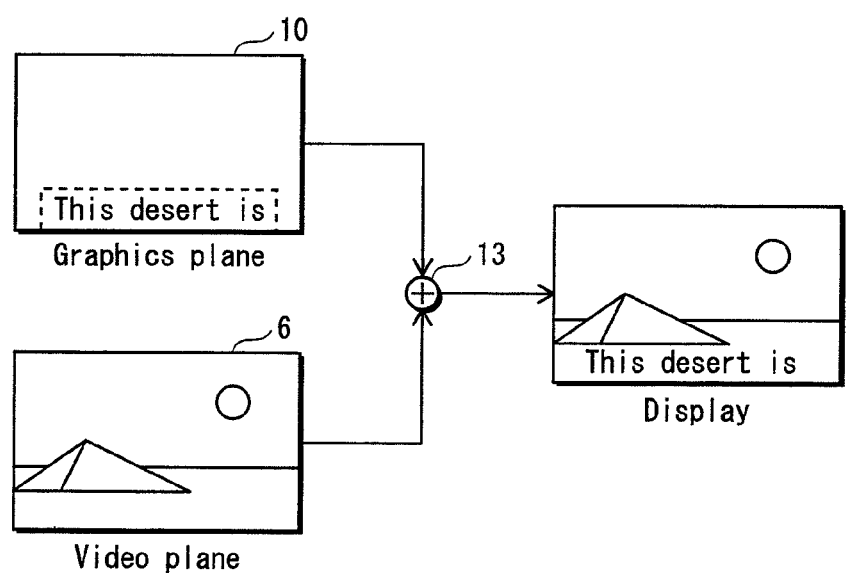
FIG. 2 shows video output by the playback device.

FIG. 2 shows video output by the playback device. As shown in FIG. 2, the composition unit 13 composites uncompressed video stored in the video plane with subtitle characters stored in the graphics plane 10 so as to obtain a composite image. Then, the composition unit 13 outputs the composite image to the display.

This concludes a description of the internal structure of the playback device. The following describes an internal structure of the text subtitle stream, with reference to the drawings.

The text subtitle stream includes a plurality of pieces of character-string display instruction information. Each piece of the character-string display instruction information indicates: which character string to display; when to display the character string; and how to display the character string.

Figure 3:
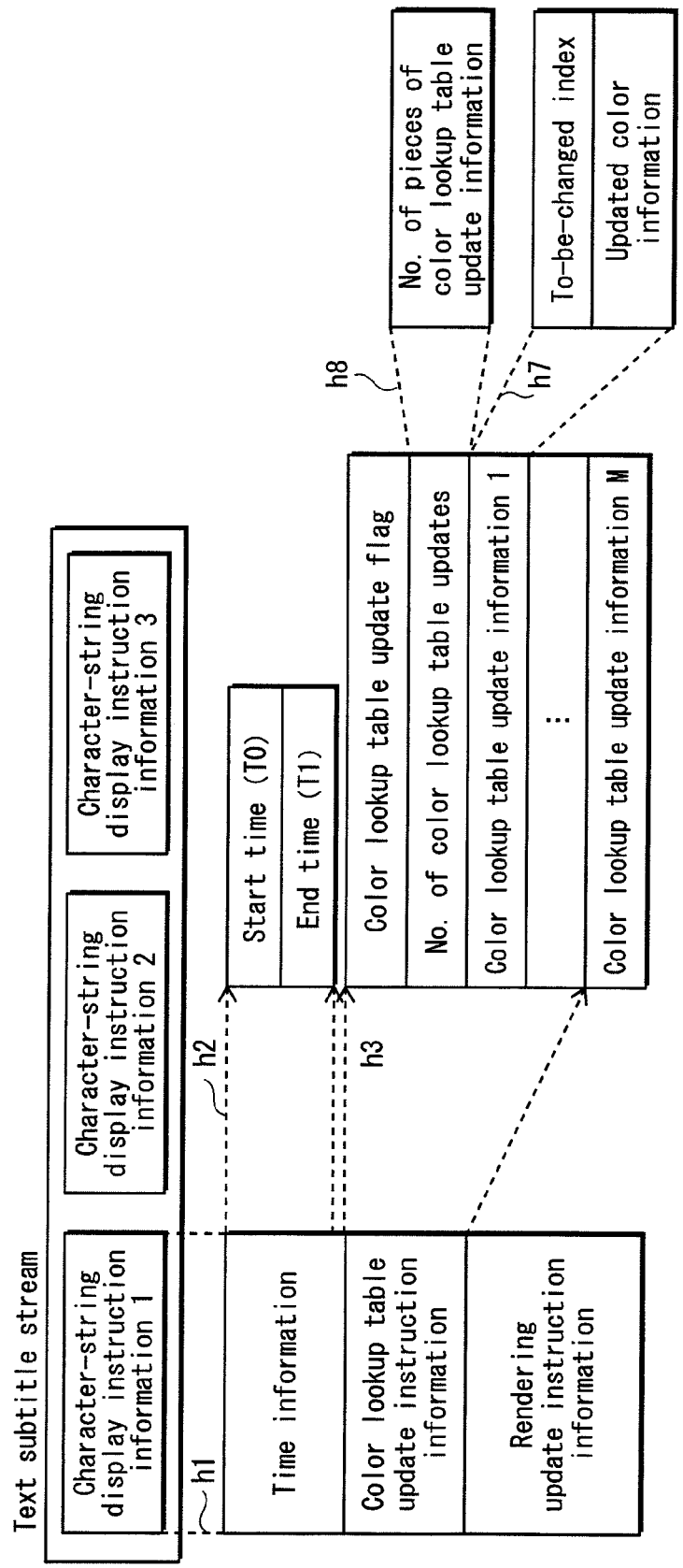
FIG. 3 shows an internal structure of character-string display instruction information in a text subtitle stream.

FIG. 3 shows an internal structure of the character-string display instruction information in the text subtitle stream.

The upper half of FIG. 3 shows the text subtitle stream including a plurality of character-string display instruction information 1, 2, 3 and so on. Each piece of the character-string display instruction information is an instance generated from a common class structure, and has a common internal structure. A lead line h1 shows a structure of the character-string display instruction information in close-up. As shown by the lead line h1, each piece of the character-string display instruction information has three common information pieces, namely: "time information"; "color lookup table update instruction information"; and "rendering update instruction information". The lead line h2 shows a structure of the time information in close-up. As shown by the lead line h2, the time information includes a "start time" and an "end time" on a time axis, where the start time is a time for starting display based on the character-string display instruction information, and the end time is a time for ending display based on the character-string display instruction information. The start and end times are synchronization points on the time axis of a video stream. T0 and T1 in FIG. 3 are examples of the synchronization points.

A lead line h3 shows a structure of the color lookup table update instruction information in close-up. As shown by the lead line h3, the color lookup table update instruction information includes: a "color lookup table update flag"; "the number of color lookup table updates"; and M pieces of "color lookup table update information".

The "color lookup table update flag" indicates whether to update the color lookup table, and has two states, namely "update" and "non-update" states.

A lead line h8 shows a structure of the "number of color lookup table updates" in close-up. As shown by the lead line h8, the number of color lookup table updates indicates the number of pieces "M" of color lookup table update information.

The "color lookup table update information" is an arbitrary element that is added only when the "color lookup table update flag" is set to "update". When the "color lookup table update flag" is set to "non-update", the color lookup table update information is not stored. A lead line h7 shows a structure of the color lookup table update information in close-up. As shown by the lead line h7, the color lookup table update information includes a "to-be-changed index" and "changed color information". The to-be-changed index shows the color information of an index that is to be changed in the color lookup table, at the start time in the time information. The updated color information shows which color information is to be assigned to the target index. This concludes the description of the color lookup table update information. The following describes rendering update information.

Figure 4:
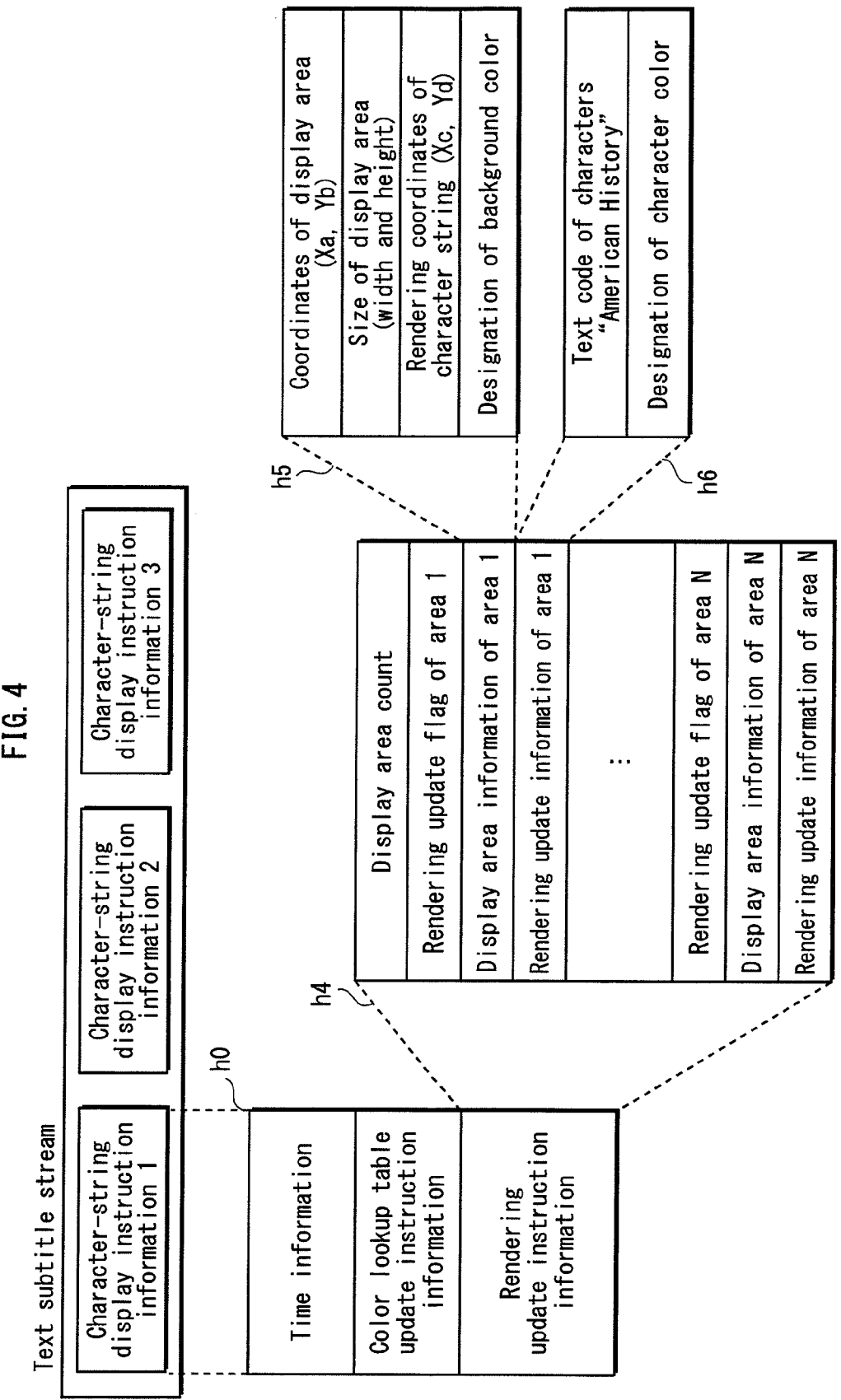
FIG. 4 shows an internal structure of rendering update information.

FIG. 4 shows an internal structure of the rendering update information. A lead line h4 shows a structure of the rendering update information in close-up. The rendering update information has a data structure corresponding to the number of display areas in the graphics plane 10. When the number of display areas in the graphics plane 10 is "N", the rendering update information has a data structure as shown in FIG. 4. When the number of display areas is N, the rendering update information includes the following, as shown by the lead line h4: "the display area count"; "the rendering update flag of area 1"; "the display area information of area 1"; "the rendering update information of area 1"; "the rendering update flag of area N"; "the display area information of area N"; and "the rendering update information of area N". When the display area count is "0", the rendering update information only includes "the display area count". In the rendering update information, each set of a rendering update flag, display area information, and rendering update information corresponds to a different one of areas 1 to N. The number of sets thereof is equal to the number of display areas. The following describes the elements constituting the rendering update instruction information.

"The display area count" shows how many character-string display areas there are on a screen.

The "rendering update flag" indicates whether to update rendering, and has two states, namely "update" and "non-update" states. When the rendering update flag is set to "update", the rendering update information is stored. When the rendering update flag is set to "non-update", the rendering update information is not stored, and the previous display contents are maintained. The number of areas to be displayed is designated by the display area count. The display area count dynamically changes according to a current playback time point in a video stream. When the display area count decreases, the areas equivalent to the decreased number return to a non-display state. Here, provided that the rendering update flag is set to "non-update", an area not to be updated from a previous display is determined based on the display area information. In other words, when the rendering update flag is set to "non-update", an area unchanged from the previous display is displayed without updating a piece of display area information corresponding to the area, among pieces of display area information in pieces of character-string display instruction information.

A lead line h5 shows a structure of the display area information in close-up. The display area information includes: "the coordinates (Xa, Xb) of a display area"; "the size (width and height) of the display area"; "the rendering coordinates (Xc, Yd) of a character string"; and "the designation of a background color".

A lead line h6 shows a structure of the rendering update information. The rendering update information includes "the text code of characters ("American history")" and "the designation of a character color". It is possible to designate a plurality of pieces of rendering update information with respect to one display area, so as to change a character color for each character. An index to which a background color is assigned by display area information and an index to which a character color is assigned by rendering update information are both indexes to which color information is assigned. The color information is assigned to the indexes by first or second color lookup table update information. The first color lookup table update information is included in character-string display instruction information to which the display area information and the rendering update information belong. The second color lookup table update information is included in character-string display instruction information preceding the character-string display instruction information to which the display area information and the rendering update information belong. This means that (i) the index to which the background color is assigned by the display area information and (ii) the index to which the character color is assigned by the rendering update information are the same as the indexes to which the color information is assigned by the color lookup table update information. Accordingly, when the indexes to which the color information is assigned by the display area information and the rendering update information are excluded from the assignment of gradation colors, the indexes assigned to the color information by the color lookup table update information are excluded from the assignment of gradation colors.

Figure 5:
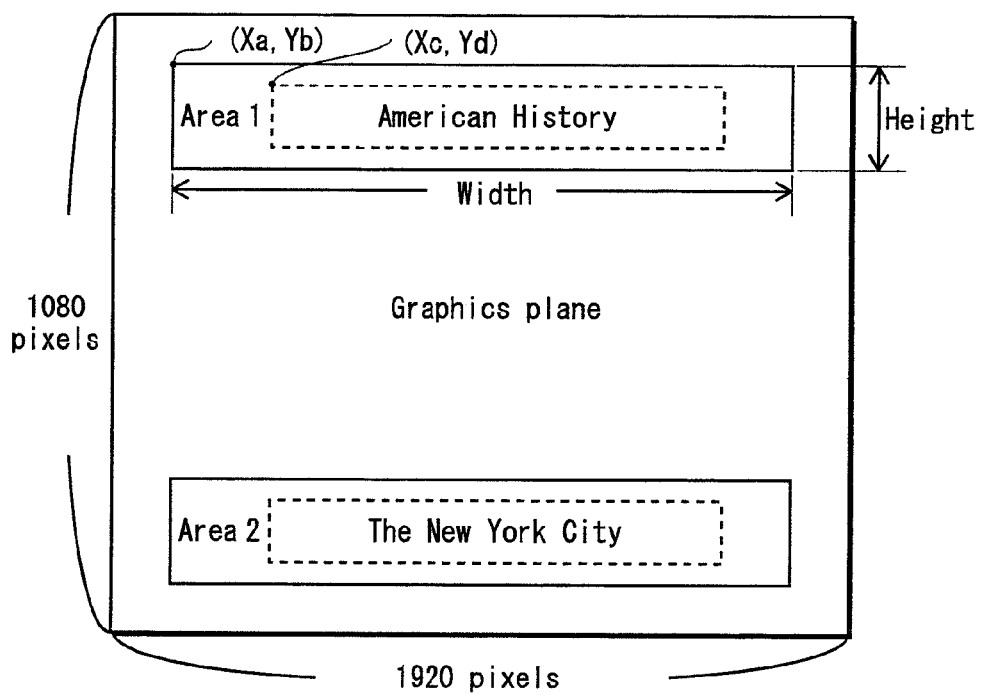
FIG. 5 shows a relationship between a graphics plane, display area information, and the rendering update information.

FIG. 5 shows a relationship between a graphics plane, display area information, and the rendering update information. The graphics plane stores 1080×1920 pixels, and can secure therein one or more areas (e.g., areas 1 and 2). the display coordinates (Xa, Yb) of an area in the graphics plane and the rendering coordinates of a character string (Xc, Yd) in the area are designated by the display area information in the rendering update instruction information. The subtitle characters "American History . . . " are arranged in the area. The subtitle characters "American History . . . " correspond to text codes indicated by the rendering update information in the rendering update instruction information.

The following describes one example of a text subtitle stream targeted for pre-analysis described below.

Figure 6:
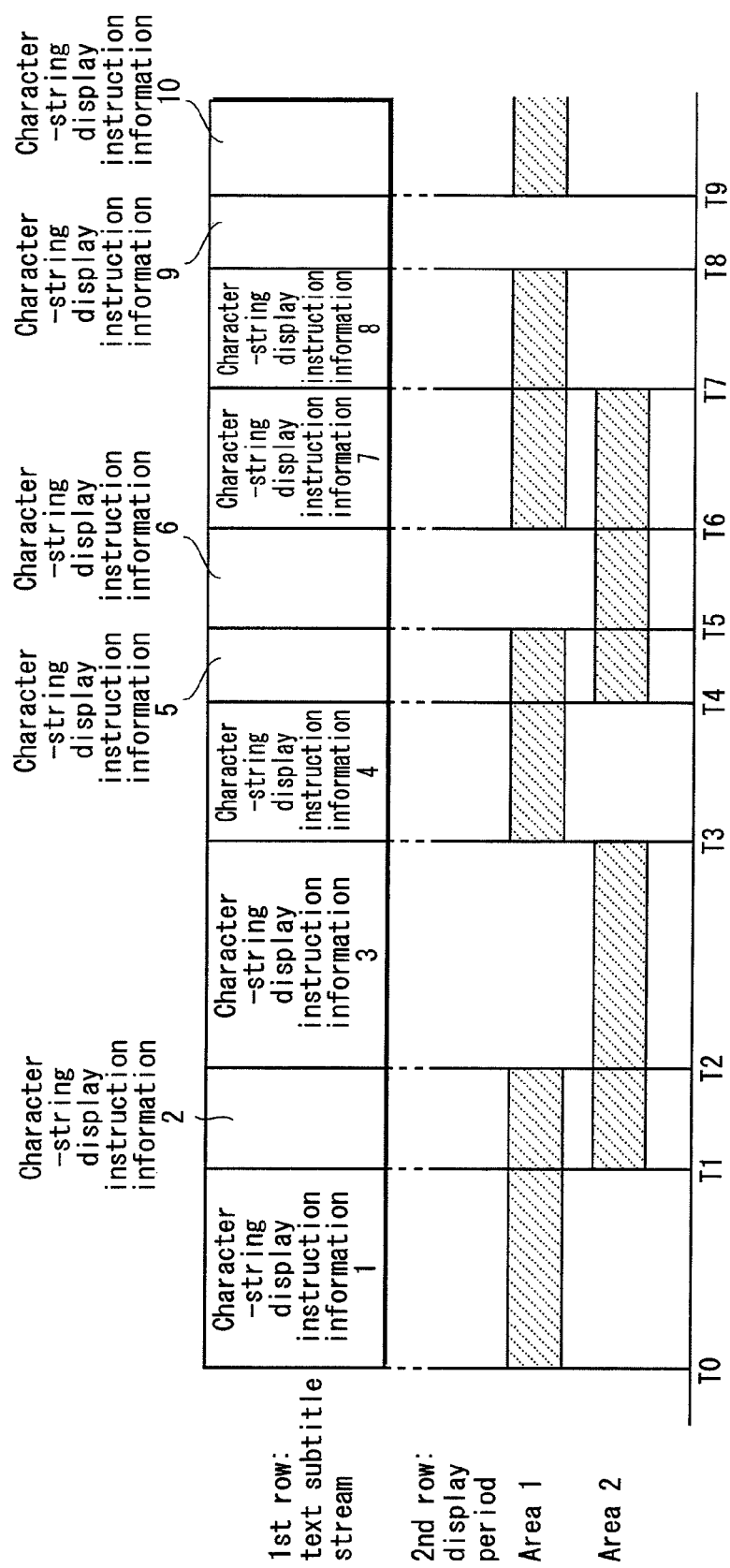
FIG. 6 shows one example of how start and end times in the character-string display instruction information are set on a time axis.

FIG. 6 shows one example of how start and end times in a plurality of pieces of character-string display instruction information (i.e., pieces of character-string display instruction information 1 to 10) are set on the playback time axis of a video stream. In FIG. 6, the first row shows a text subtitle stream including the pieces of character-string display instruction information 1 to 10. The second row shows the display periods of the areas 1 and 2 shown in FIG. 5.

Figure 7:
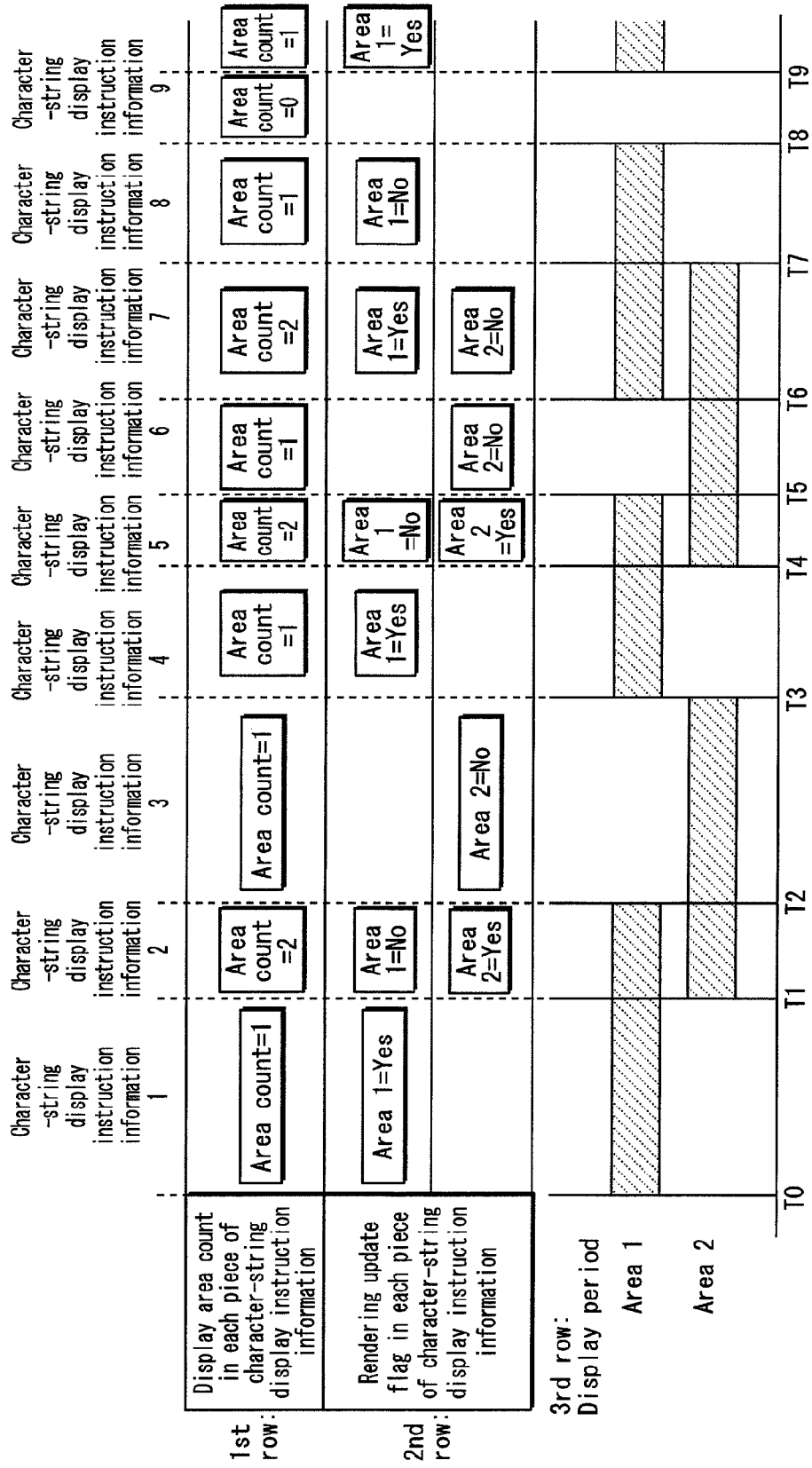
FIG. 7 shows how to set a display area count and one or more rendering update flags in each piece of character-string display instruction information, in a text subtitle stream in which start and end times are set as shown in FIG. 6.

FIG. 7 shows how to set the display area count and one or more rendering update flags in each piece of character-string display instruction information, in the text subtitle stream in which the start and end times are set as shown in FIG. 6. In FIG. 6, the first row shows the setting of the display area count in the rendering update information included in each piece of the character-string display instruction information. The second row shows the setting of the one or more rendering update flags in the rendering update information included in each piece of the character-string display instruction information. The third row shows the display periods of the areas 1 and 2.

In FIG. 7, times T0 and T1 represent start and end times in the character-string display instruction information 1, respectively. Times T1 and T2 represent the start and end times in the character-string display instruction information 2, respectively. In FIG. 7, the display area 1 continues the same display from the time T0 to T3. In the third row, the display period of the area 1 overlaps that of the area 2 between the times T1 and T2.

In the character-string display instruction information 5 starting from time T4, the rendering update flag in the area 1 is set to "non-update". Therefore, the area 1 maintains the same display as the time T3.

In the character-string display instruction information 7 starting from time T6, the display area count is "2". The rendering update flags of the areas 1 and 2 are respectively set to "update" and "non-update". Therefore, the display period of the area 1 overlaps with that of the area 2 between the times T6 and T7.

This concludes the description of one example of character-string display instruction information targeted for pre-analysis. The following describes details of the text subtitle decoder 9.

Figure 8:
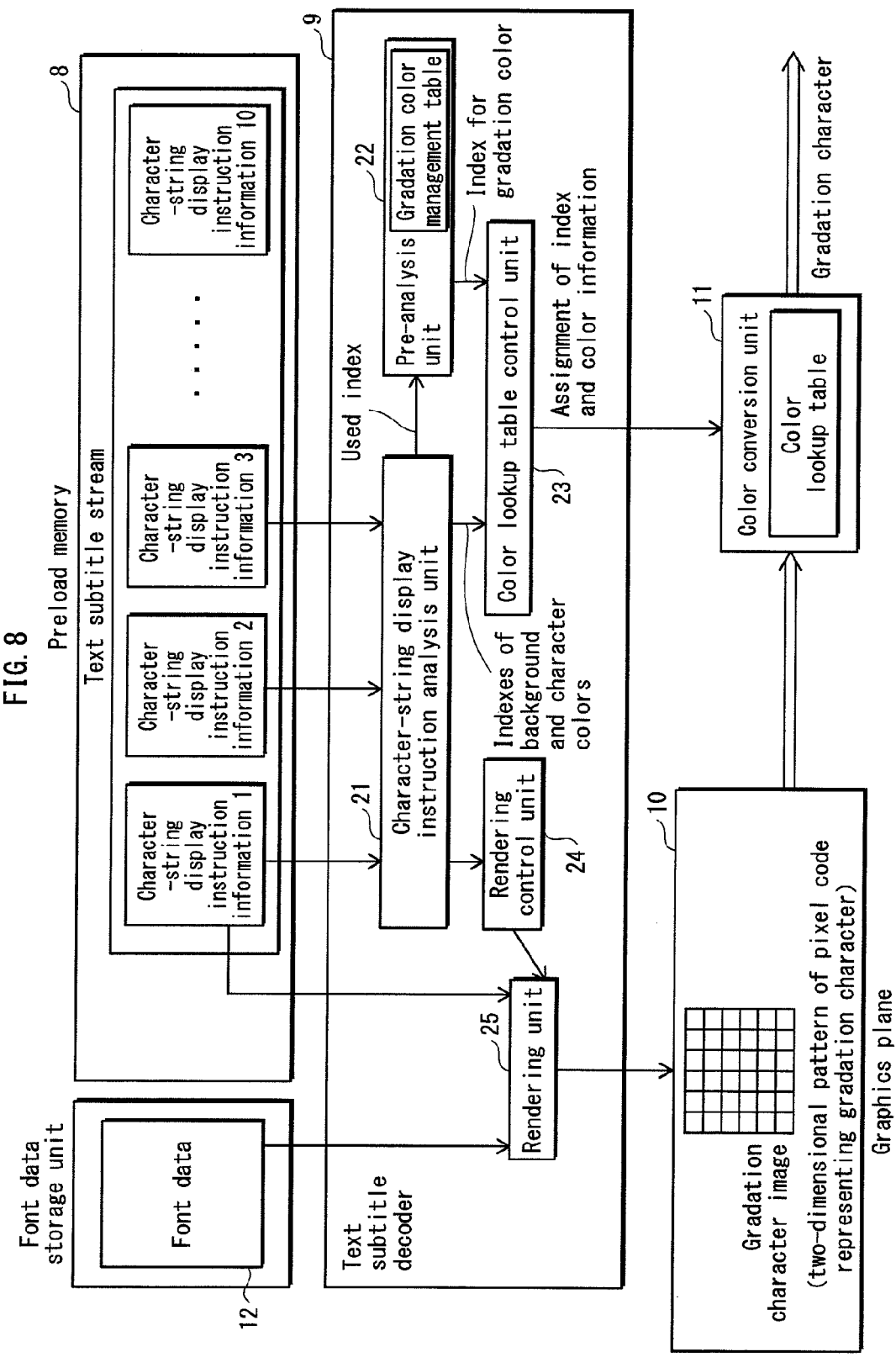
FIG. 8 shows an internal structure of a text subtitle decoder 9.

FIG. 8 shows an internal structure of the text subtitle decoder 9. As shown in FIG. 8, the text subtitle decoder 9 includes a character-string display instruction analysis unit 21, a pre-analysis unit 22, a color lookup table control unit 23, a rendering control unit 24, and a rendering unit 25.

<Character-String Display Instruction Analysis Unit 21>

The character-string display instruction analysis unit 21 pre-analyzes the use of indexes, prior to playback of a playlist. The start of a pre-analysis range is the start time of a piece of character-string display instruction information (hereinafter, "$i^{th}$ with character-string display instruction information") in which the rendering update flags of all display areas are set to "update", among all pieces of character-string display instruction information.

The end of the pre-analysis range is the end time of $j^{th}$ character-string display instruction information. The $j^{th}$ character-string display instruction information is located immediately before a piece of character-string display instruction information that is subsequent to $i^{th}$ character-string display instruction information, and in which the display area count in the rendering update information is "0" or the rendering update flags of all display areas whose number is designated by the display area count in the rendering update information are set to "update".

Here, the number of "all display areas" is the display area count in the rendering update information, as described above. When the display area count is "1" and the rendering update flag of one display area is set to "update", the one display area designated by the display area count is updated.

When the display area count is "2" and the rendering update flags of two display areas are set to "update", the two display areas designated by the display area count are both updated.

A period in which the rendering update flag of any area is set to "non-update" is a period in which the use of an index continues (hereinafter, "index use continuation period"). The start and end of the index use continuation period coincides the start and end of the pre-analysis range. Therefore, in the graphics plane 10, the start of the pre-analysis range is set to a timing at which all display areas designated by the display area count in the rendering update information are updated. Then, the end of the pre-analysis range is set to a timing at which the display area count in the rendering update information is "0", or a timing immediately before an update timing detected after the start of the pre-analysis range. Here, the update timing is when all the display areas designated by the display area count in the rendering update information are updated.

In FIG. 7, the display area count in the character-string display instruction information 1 is "1" and the rendering update flag of the area 1 in the character-string display instruction information is set to "update". Therefore, according to the aforementioned definition, one index use continuation period (i.e., an index use continuation period 1) is between T0 and T3. T0 is the start time of the character-string display instruction information, and T3 is the end time of the character-string display instruction information 3 which is located immediately before the character-string display instruction information 4.

The display area count in the character-string display instruction information 4 is "1", and the rendering update flag of the area 1 in the character-string display instruction information 4 is set to "update". Also, the display area count in the character-string display instruction information 9 is set to "0". Therefore, another index use continuation period (i.e., index use continuation period 2) is between T3 and T8. T3 is the start time of the character-string display instruction information 4, and T8 is the end time of the character-string display instruction information 8 which is located immediately before the character-string display instruction information 9.

In other words, each of T3 and T8 in FIG. 7 is a timing at which all display areas designated by the display area count in the rendering update information are updated. In this sense, the index use continuation periods are defined as shown FIG. 9.

Figure 9:
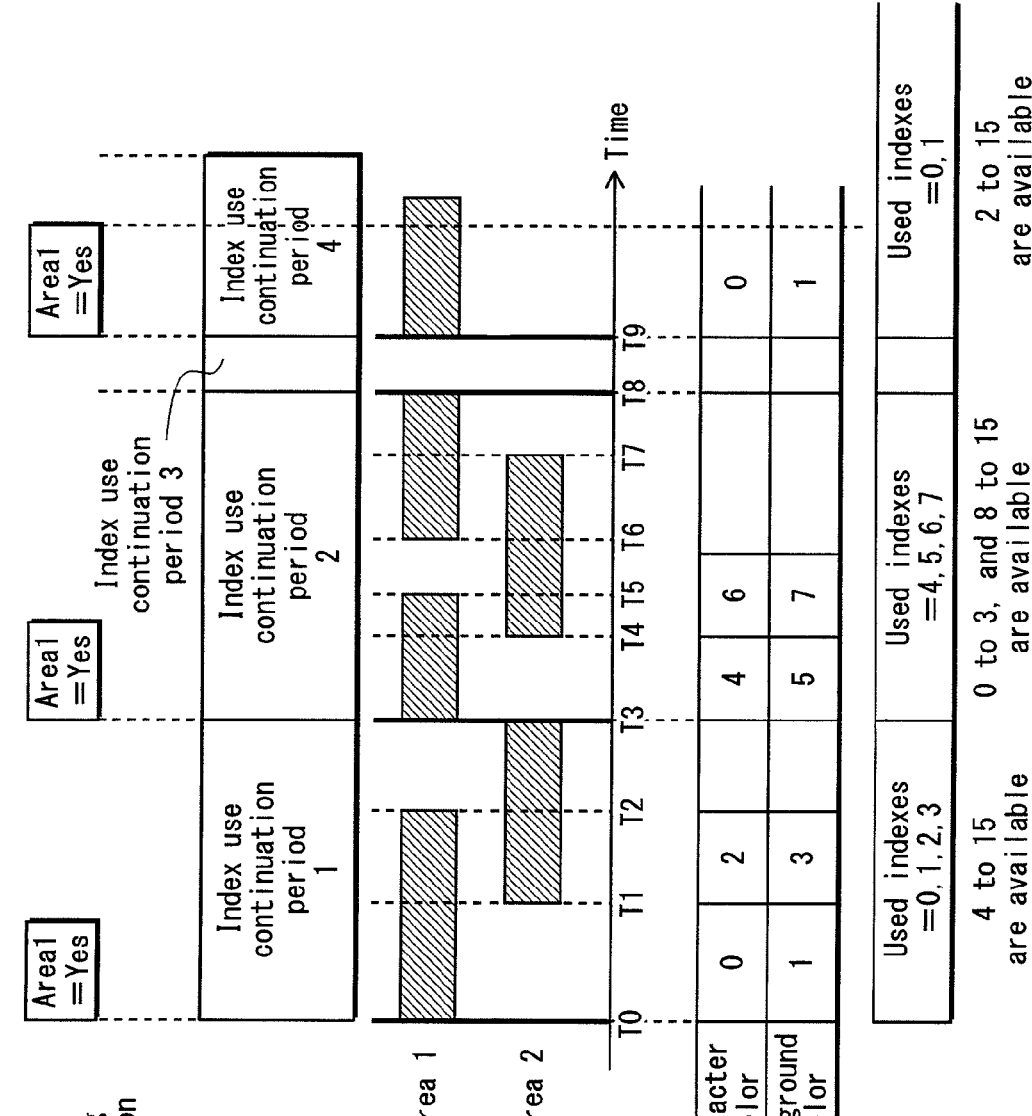
FIG. 9 shows a relationship between the maximum number of gradation indexes and the number of gradation color indexes.

FIG. 9 shows the index use continuation periods obtained by grouping the display periods in FIG. 7 by the start time of each specific piece of the character-string display instruction information. The first row shows the setting of each rendering update flag. The second row shows index use continuation periods. The third row shows display periods. The fourth row shows the use of the color lookup table. In FIG. 9, there are four index use continuation periods. Each index use continuation period starts from T0, T3, T8, and T9 at which the rendering update flag is set to "update".

The fifth row shows indexes designated by the rendering update information in the character-string display instruction information. In the rendering update information in the character-string display instruction information 1, "0" and "1" are used as indexes for a character color and a background color. In the rendering update information in the character-string display instruction information 2, "2" and "3" are used as indexes for a character color and a background color. Therefore, "0", "1", "2", and "3" are used as indexes in the index use continuation period 1.

Accordingly, "4" to "15" can be used as indexes to be assigned to gradation colors.

In the rendering update information in the character-string display instruction information 4 starting from T3, "4" and "5" are used as indexes for a character color and a background color. In the rendering update information in the character-string display instruction information 5 starting from T4, "6" and "7" are used as indexes for a character color and a background color. Therefore, "4", "5", "6", and "7" are used as indexes in the index use continuation period 2. Accordingly, "1" to "3" and "8" to "15" can be used as indexes to be assigned to gradation colors.

In the index use continuation period 1, the indexes used in the index use continuation period 2 can be assigned to gradation colors. Also, in the index use continuation period 2, the indexes used in the index use continuation period 1 can be assigned to gradation colors. Therefore, the number of indexes assignable to gradation colors is increased, resulting in subtitles being displayed clearly with many gradation colors.

Suppose that gradation colors are assigned to indexes other than "0" and "1", which are used in the character-string display instruction information 1. In this case, gradation colors may be assigned to the indexes "2" and "3", which are designated by the rendering update information in the character-string display instruction information 2. In the present embodiment, however, an index use continuation period is pre-analyzed, and used indexes are searched for in this index use continuation period. Therefore, the indexes "0", "1", "2", and "3", which are used in a period (between T1 and T2) where the number of used indexes is the largest and the display periods overlap each other, are excluded from the assignment of gradation colors. This reliably eliminates the possibility of gradation colors being displayed in inappropriate colors.

When a range of the pre-analysis is determined, the character-string display instruction analysis unit 21 instructs the pre-analysis unit 22 to create a gradation color management table within the range. The gradation color management table is used to manage the indexes of gradation colors each assigned to a pair of the index of a character color and the index of a background color. Upon receiving, from the pre-analysis unit 22, a notification indicating that the gradation color management table has been created, the character-string display instruction analysis unit 21 transmits, to the color lookup table control unit 23, the color lookup table update information included in the color lookup table update instruction information, at the time designated by the time information. Also, the character-string display instruction analysis unit 21 transmits, to the rendering control unit 24, a rendering update instruction written in the rendering update instruction information.

<Pre-Analysis Unit 22>

Upon receiving the instruction for creating the gradation color management table from the character-string display instruction analysis unit 21, the pre-analysis unit 22 acquires character-string display instruction information belonging to the index use continuation period. Then, the pre-analysis unit 22 pre-analyzes the use of indexes before the start of the rendering processing, and creates the gradation color management table.

Specifically, the pre-analysis unit 22 acquires indexes used for a character color and a background color (hereinafter, "used index information") from the rendering update information in the character-string display instruction information. Further, the pre-analysis unit 22 acquires a pair of indexes (hereinafter, "color pair information"); where one index is designated for a character color and the other index is designated for a background color.

The pre-analysis unit 22 creates the gradation color management table based on the use index information and the color pair information. FIGS. 10A, 10B, 10C, and 10C each show one example of how to create a gradation color management table. FIG. 10A shows a used index management table showing used indexes identified by an analysis with respect to the text subtitle stream. As shown in FIG. 10A, it is assumed that the indexes "0" and "2" are used for character colors and the indexes "1" and "3" are used for background colors in an index use continuation period. A gradation color management table created in this case is shown in FIG. 10B.

FIG. 10B shows one example of a gradation color management table. Since indexes of "16" and above are available in FIG. 10A, the indexes "16" to "19" are used for gradation colors. In the gradation color management table, each pair of a character color index and a background color index (i.e., a pair of "0" and "1" and a pair of "2" and "3") is associated with gradation color indexes. Specifically, the pair of "0" and "1" is associated with the gradation color indexes "16" and "17". Also, the pair of "2" and "3" is associated with the gradation color indexes "18" and "19". The number of gradation color indexes assigned to each pair of a character color and background color is calculated from the number of unused indexes and the number of pairs of character colors and background colors.

In the case of creating a gradation character image, the number of gradations is determined based on the number of bits used to represent one pixel. In a case where M represents the number of used indexes in an index use continuation period and n represents the bit width of an index, the number N of gradation colors used for gradation display in the index use continuation period is calculated using the following formula: the number N of gradation colors=$(2^n-M)$/the number of pairs of character colors and background colors.

FIGS. 11A, 11B, and 11C each schematically show how to determine the number of gradations.

When one pixel is represented by 2 bits, for example, the number of gradations is 4 ($=2^2$). FIG. 11A shows gradation display using 2-bit pixel values. When a pixel value is represented by 2 bits, the pixel values "0" and "3" are already assigned to a background color and a character color, respectively. Therefore, there are two indexes that are to be assigned to gradation colors.

FIG. 11B shows gradation display using 4-bit pixel values. When one pixel is represented by 4 bits, the number of gradations is 16 ($2^4$). Therefore, there are fourteen indexes that are to be assigned to gradation colors.

FIG. 11C shows a relationship between the maximum number of gradation indexes and the number of gradation color indexes. In the case of 2 bits, it is possible to use four indexes. Accordingly, two indexes can be assigned to gradation colors, since the other two indexes are used for a character color and a background color.

In the case of 4 bits, it is possible to use sixteen indexes. Accordingly, fourteen indexes can be assigned to gradation colors, since the other two indexes are used for a character color and a background color. For example, when the maximum number of gradation indexes is 3, the number of gradation color indexes is 2.

This concludes a description in a case where the number of bits assigned to one pixel is 4. Based on the premise that the number of bits assigned to one pixel is 4, the following describes how to calculate the number of gradation color indexes in a case where the number of bits assigned to one pixel is 8 in a frame memory.

When the number of bits assigned to one pixel is 8 in a frame memory, the pixel code usable for each pixel may take any of 256 values. In other words, when the number of bits per pixel is 8, 256 colors may be used for subtitle display. Suppose that, in these pixels, 30 indexes are used for a character color and a background color, and there are 14 pairs of character colors and background colors. In this case, the maximum number of gradation indexes assignable to each pair of a character color and a background color is as follows: (256−30)/14−16.14. Provided that this value is the maximum number of gradation indexes, the number of gradation indexes necessary in the case of 4 bit is 4 or more. Therefore, the number of gradation color indexes is 14.

After creating the gradation color management table, the pre-analysis unit 22 notifies the character-string display instruction analysis unit 21 that the gradation color management table has been created.

<Color Lookup Table Control Unit 23>

The color lookup table control unit 23 acquires the gradation color management table, and also acquires color lookup table update instruction information from the character-string display instruction analysis unit 21. Then, the color lookup table control unit 23 creates a color lookup table based on the gradation color management table and the color lookup table update instruction information. FIG. 10C shows the use of a color lookup table when the use of a character color index and a background color index is as shown in FIG. 10A. The color lookup table shows indexes and color information.

After creating the color lookup table, the color lookup table control unit 23 instructs the color conversion unit 11 to store the color lookup table. Upon receiving an update instruction from the character-string display instruction analysis unit 21, the color lookup table control unit 23 updates all pieces of color information of indexes specified by the update instruction. Then, the color lookup table control unit 23 checks whether designated indexes are included in the gradation color management table as a character color and a background color. When designated indexes are included in the gradation color management table, the color lookup table control unit 23 calculates pieces of color information of gradation color indexes corresponding to the designated indexes. For example, assume that N represents the number of gradations, the character color is the character color ($\alpha a$, Ra, Ga, Ba), and the background color is the background color ($\alpha b$, Rb, Gb, Bb). In this case, the gradation color is calculated as follows.

Gradation color n ($\alpha b+(\alpha a-\alpha b)\times n/(N-1)$, $Rb+(Ra-Rb)\times n/(N-1)$, $Gb+(Ga-Gb)\times n/(N-1)$, $Bb+(Ba-Bb)\times n/(N-1)$), where n=1 to N−2.

Subsequently, the color conversion unit 11 stores the color lookup table received from the color lookup table control unit 23. FIG. 10D shows a color lookup table in which color information is assigned to each gradation color index. As compared to FIG. 10C, FIG. 10D shows that the indexes "16", "17", "18", and "19" are assigned to pieces of color information (r16, g16, b16), (r17, g17, b17), (r18, g18, b18), and (r19, g19, b19), respectively. Gradation colors are produced in the graphics plane 10, by creating a two-dimensional pattern of pixel codes with use of the indexes "16", "17", "18", and "19" as pixel values.

<Rendering Control Unit 24>

The rendering control unit 24 instructs the rendering unit 25 to perform rendering into the frame memory, in accordance with an instruction from the character-string display instruction analysis unit 21. The rendering update information transmitted from the character-string display instruction analysis unit 21 does not include any gradation color indexes. The rendering control unit 24 acquires the gradation color indexes from the gradation color management table. In other words, the rendering control unit 24 acquires, from the gradation color management table, gradation color indexes corresponding to the pairs of the character color index and the background color index used in the rendering update information in the character-string display instruction information. Then, the rendering control unit 24 instructs the rendering unit 25 to render gradation characters using the acquired gradation color indexes.

<Rendering Unit 25>

The rendering unit 25 performs rendering into the graphics plane 10 in accordance with an instruction from the rendering control unit 24. The rendering is performed in a position where a background and character strings are designated, in accordance with a designated size and designated indexes. Character images are generated from outline information contained in font data. Gradation character images are generated using the number of gradations that have been designated. The rendering unit 25 renders gradation characters with use of the gradation color indexes transmitted from the rendering control unit 24. The font data is acquired from the font data storage unit 12.

FIG. 12 shows one example of a pixel code pattern representing a gradation character. In FIG. 12, each pixel code is 1 byte. Among the pixel codes, "FF" is used to render the character, and "00" is used to render the background. Since the pixel codes "10" to "E0" are assigned to gradation colors, the outline portion of the character is rendered with use of these pixel codes "10" to "E0". This reduces jaggies along the outline of the character.

Figure 13:
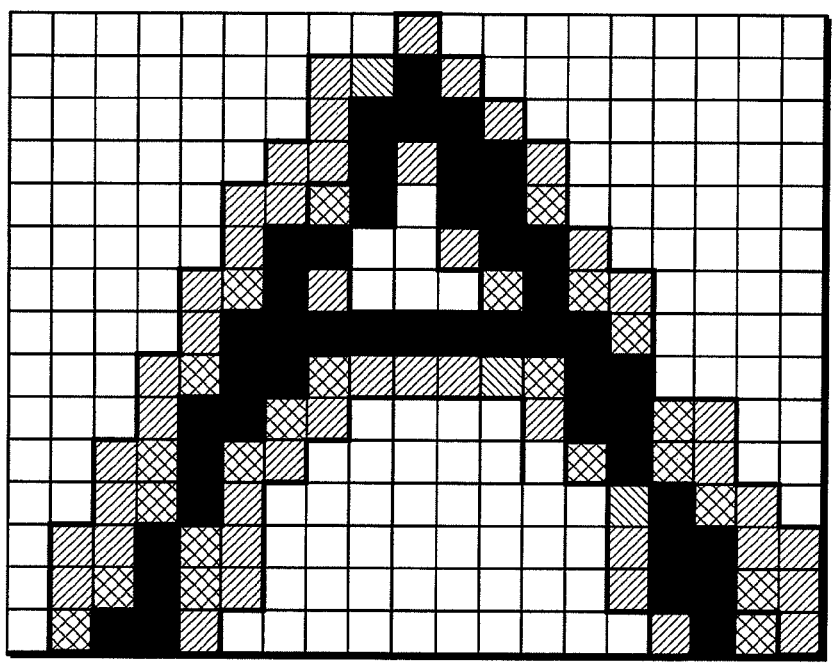
FIG. 13 is one example of a gradation character displayed by performing color conversion for the pixel code pattern shown in FIG. 12.

FIG. 13 shows a gradation character displayed by performing color conversion on the pixel code pattern shown in FIG. 12.

Figure 14:
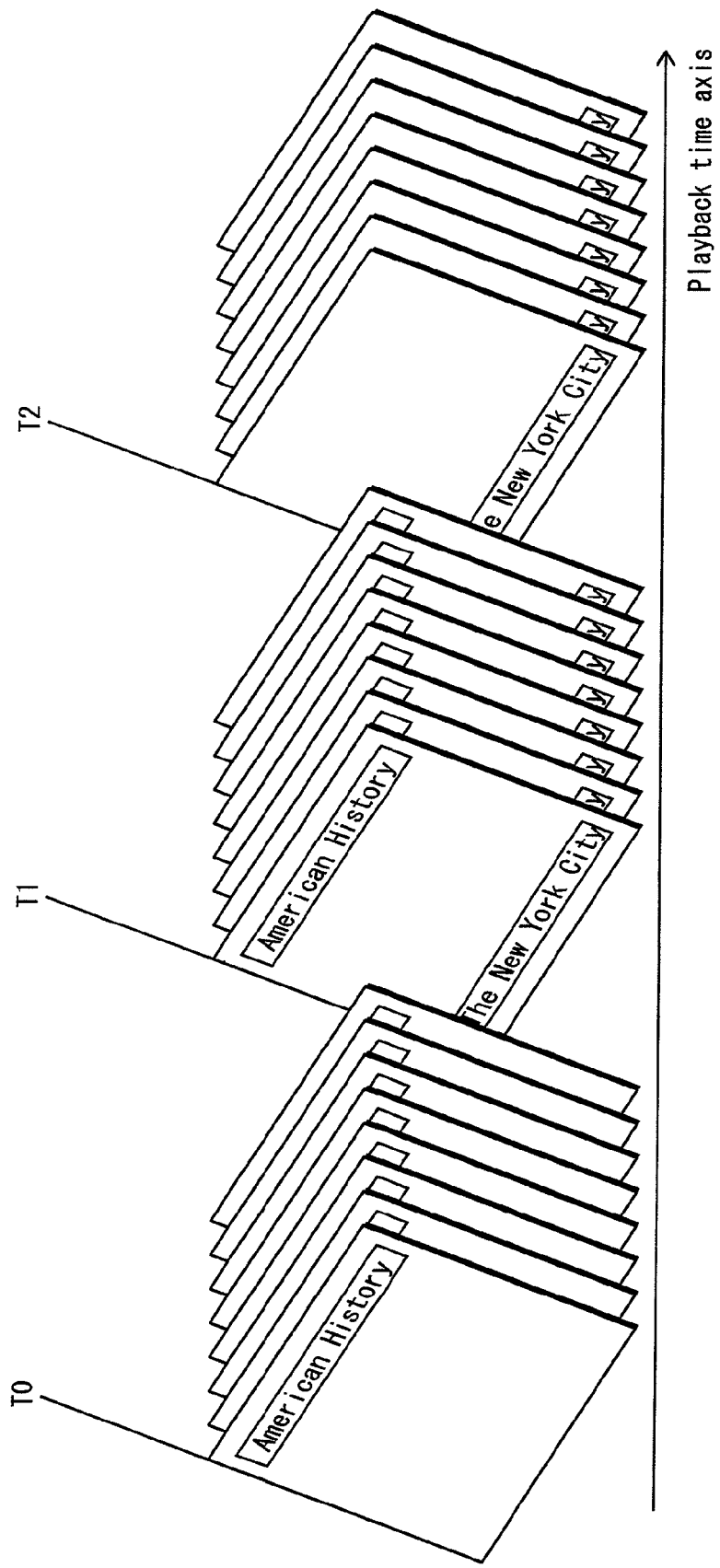
FIG. 14 is one example of a playback image.

FIG. 14 shows playback images displayed by the playback device. Composite images as shown in FIG. 14 are obtained by expanding data stored in the graphics plane 10 and compositing the expanded data with moving images in the video plane 6. In these composite images, subtitles in each area can be changed in the course of playback of a video stream. FIG. 14 shows "American History" as subtitles in the area 1, and "The New York City" as subtitles in the area 2. At T1, "American History" is displayed. At T2, "American History" and "The New York City" are displayed. At T3, only "The New York City" is displayed.

The components of the text subtitle decoder as described above may be implemented by software. Specifically, a program to be installed into the playback device is created by writing the processing steps shown by the flowcharts of FIGS. 15 to 19 in a programming language.

Figure 15:
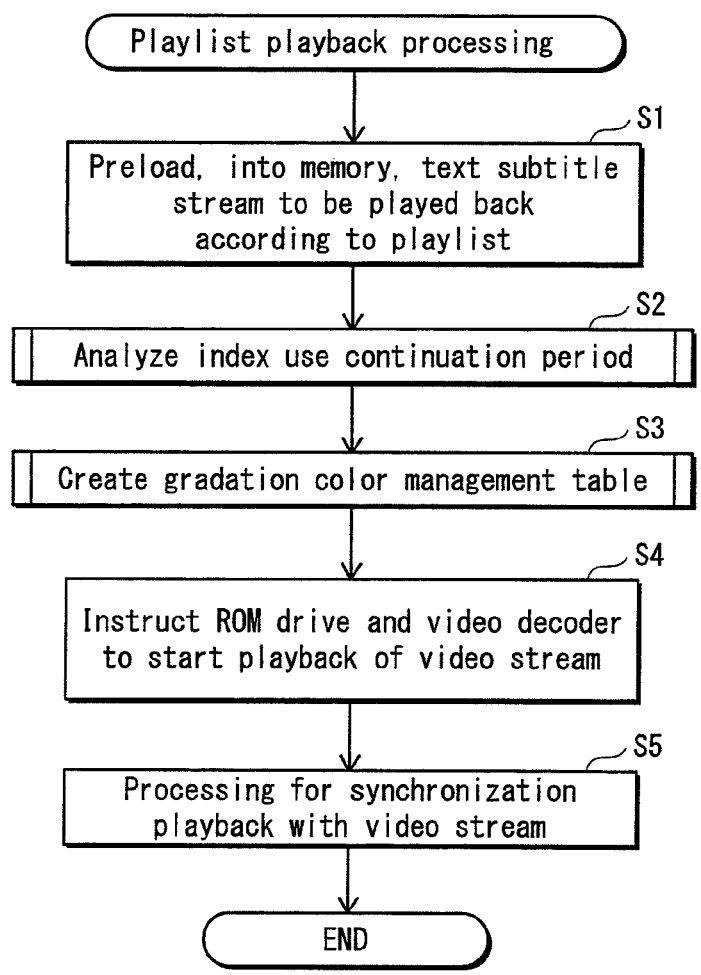
FIG. 15 is a flowchart showing steps of playlist playback processing.

FIG. 15 is a flowchart showing a series of processing steps as a main routine in playlist playback processing. First, the playback device preloads a text subtitle stream that is to be played back according to a playlist (step S1), and analyzes an index use continuation period (step S2). Then, the playback device creates a gradation color management table (step S3), gives an instruction for starting playback of a video stream, and starts processing for synchronization playback with the video stream (step S5).

Figure 16:
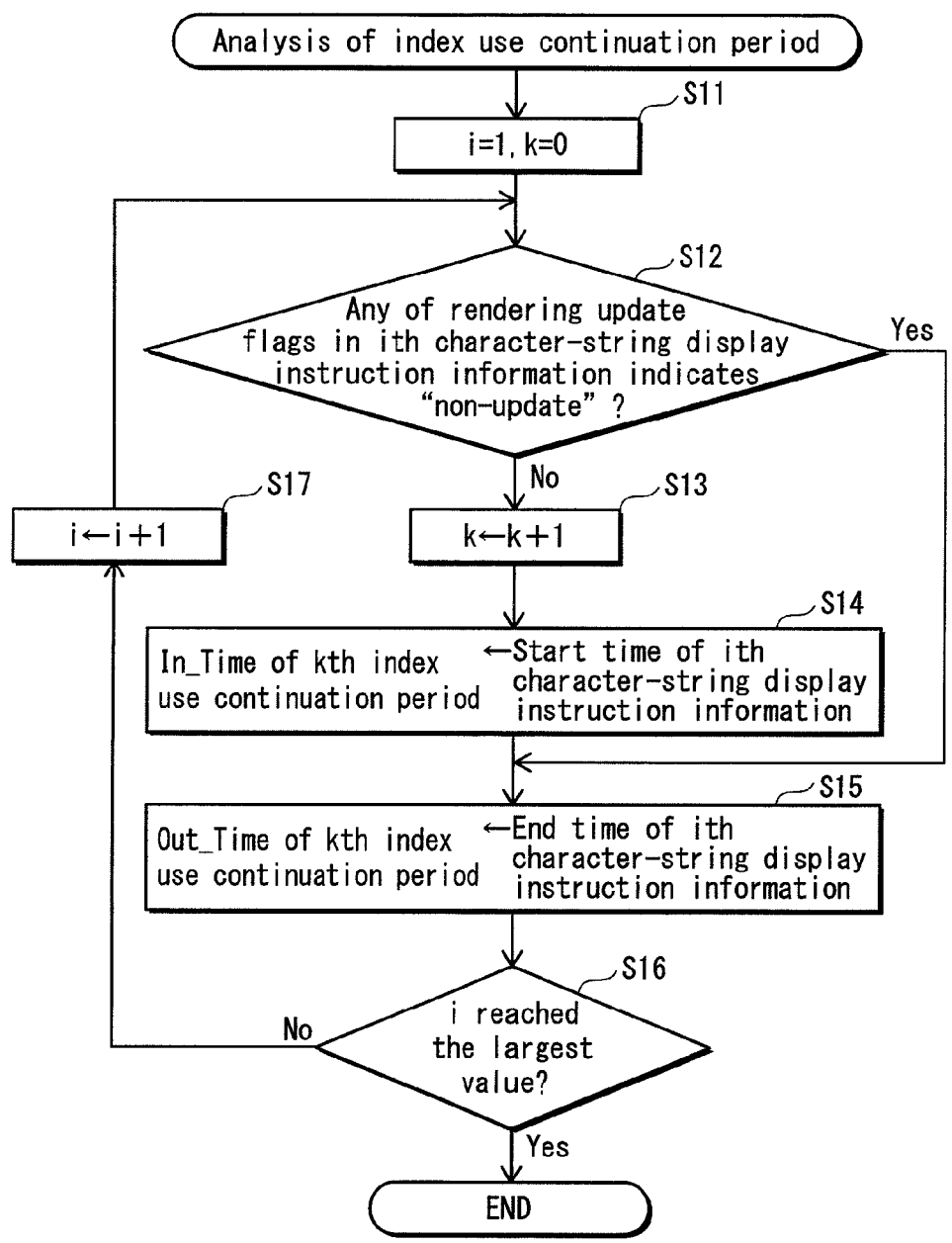
FIG. 16 is a flowchart showing processing steps of analyzing an index use continuation period.

FIG. 16 is a flowchart showing processing steps of analyzing an index use continuation period. A variable i specifies a certain piece of character-string display instruction information, and a variable k specifies a certain index use continuation period. In_Time is a variable indicating the start point of an index use continuation period, and Out_Time is a variable indicating the end point of an index use continuation period.

The processing of steps S11 to S17 has a loop structure. In this loop structure, the playback device initializes the variable i by "1", and the variable k by "0" (step S11), and then repeats the processing of steps S12 to S17. This loop ends when the variable i is judged to have reached the largest value in step S16. The variable i is incremented in step S17 as long as the variable i takes a value other than the largest value.

In step S12, the playback device judges whether any of the rendering update flags of display areas in the $i^{th}$ character-string display instruction information indicates "non-update". Assume that all pieces of rendering update information in the $i^{th}$ character-string display instruction information indicate "update", and the $i^{th}$ character-string display instruction information instructs an update of each display area whose number is designated by the display area count in the rendering update information. In this case, there is no rendering update flag that is set to "non-update". Therefore, the playback device judges negatively (i.e., "No") in step S12. Then, the playback device increments the variable k (step S13), sets the start time of the character-string display instruction information to the In_Time of a $k^{th}$ index use continuation period (step S14), and sets the end time of the character-string display instruction information to the Out_Time of the $k^{th}$ index use continuation period (step S15). This enables the display period of the $i^{th}$ character-string display instruction information to be one index use continuation period, namely the $k^{th}$ index use continuation period.

If even a piece of rendering update information indicates "update" in step S12, the playback device skips the processing of steps S13 and S14. This allows the playback device to set the end time of the $i^{th}$ character-string display instruction information to Out_Time of the $k^{th}$ index use continuation period, without incrementing the variable k (step S15). As a result, the display period of a piece of character-string display instruction information and that of another piece of display instruction immediately before the piece of display instruction are both included in the same $k^{th}$ index use continuation period.

Figure 17:
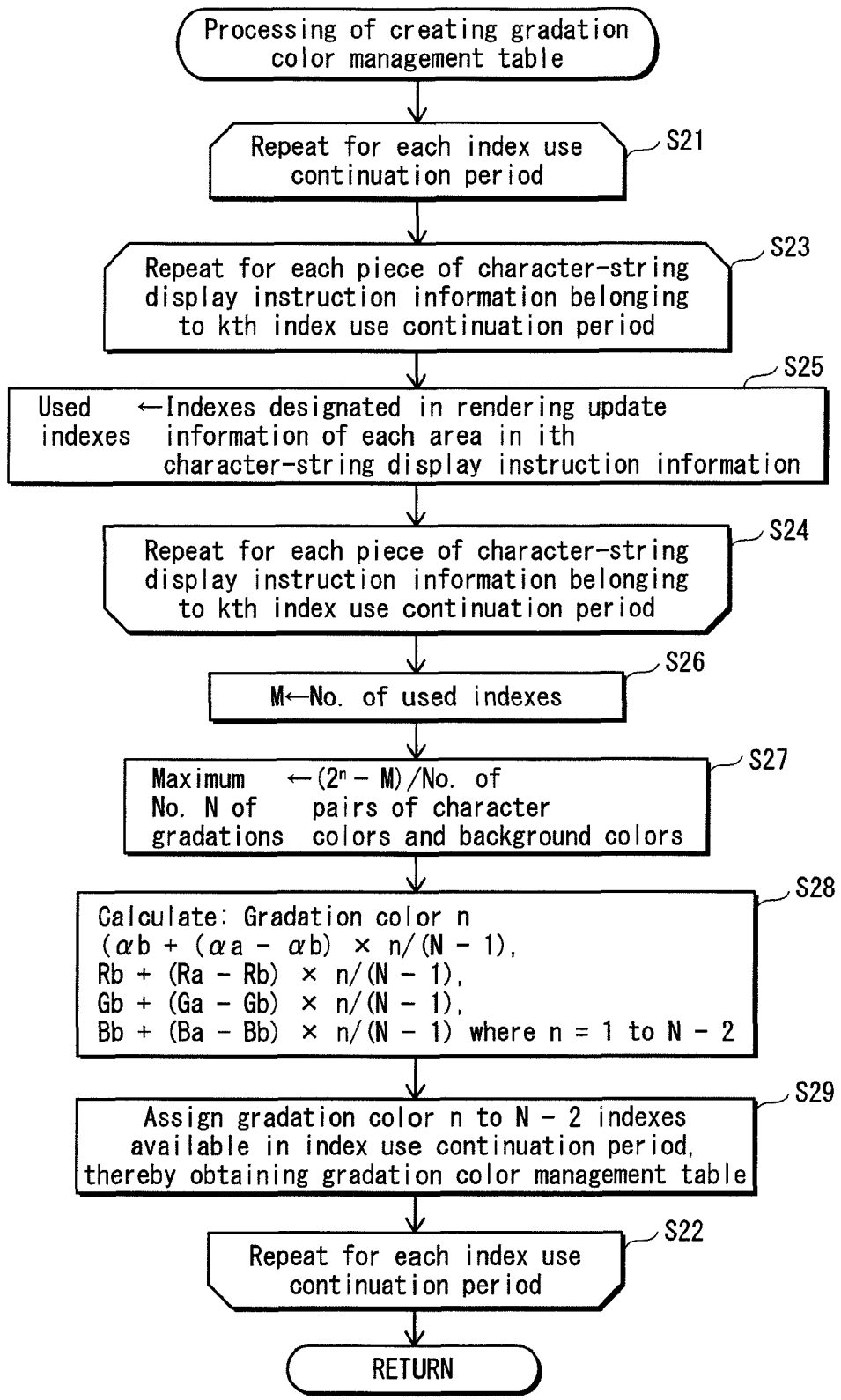
FIG. 17 is a flowchart showing processing steps of creating the gradation color management table.

FIG. 17 is a flowchart showing processing steps of creating a gradation color management table.

The processing steps S21 and S22 each have a loop structure where the processing steps S23 to S29 are repeated for each index use continuation period.

Here, the index use continuation period targeted for processing is assumed to be the $k^{th}$ index use continuation period. Also, arbitrary character-string display instruction information belonging to the $k^{th}$ index use continuation period is assumed to be the $i^{th}$ character-string display instruction information. In steps S23 and S24, the playback device performs, for each piece of character-string display instruction information, processing for handling indexes used in the rendering update information in the $i^{th}$ character-string display instruction information as used indexes (step S25).

Subsequently, with the number of used indexes being M (step S26), the playback device determines the maximum number of gradation colors M (step S27), and calculates the maximum number of gradations N using the following formula: the number N of gradations=$(2^n-M)$/the number of pairs of character colors and background colors (step S28). Then, the playback device determines the color information of the gradation color n in the range from 1 to N−1 to be: $(\alpha b+(\alpha a-\alpha b)\times n/(N-1)$, $Rb+(Ra-Rb)\times n/(N-1)$, $Gb+(Ga-Gb)\times n/(N-1)$, $Bb+(Ba-Bb)\times n/(N-1)$ (step S28). Finally, the playback device assigns the gradation color n to N−2 indexes that are available in the index use continuation period, thereby obtaining the gradation color management table (step S29).

Figure 18:
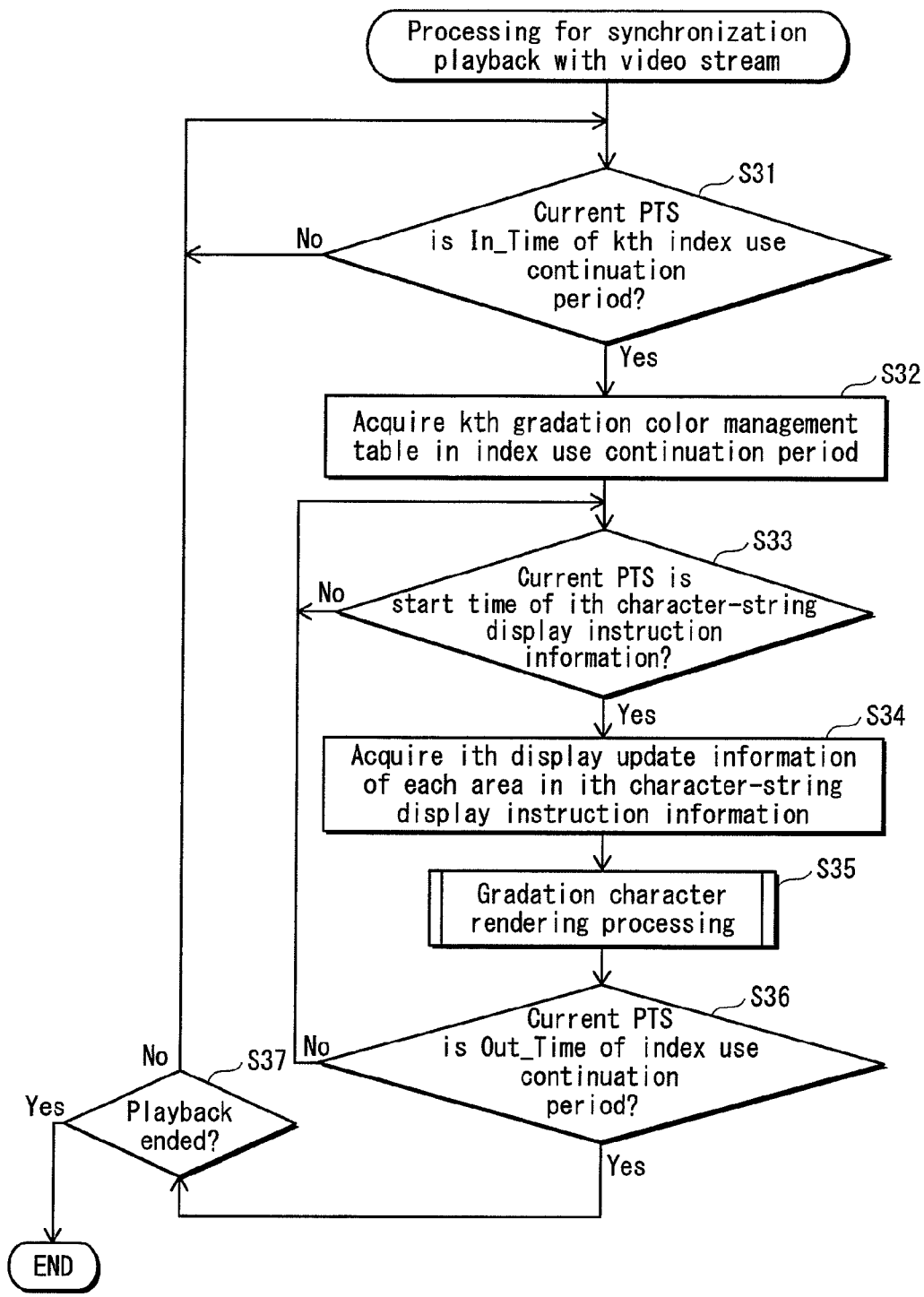
FIG. 18 is a flowchart showing processing for synchronization playback with a video stream.

FIG. 18 is a flowchart showing processing for synchronization playback with a video stream. In the flowchart, a current PTS is a variable indicating a current playback time point. The current PTS increases automatically in the course of playback of the video stream.

Step S31 is a wait loop awaiting an event in which the current PTS becomes the In_Time of one of the index use continuation periods. The playback device judges whether the current PTS is the In_Time of one of the index use continuation periods (step S31). When judging that the current PTS is In_Time ("Yes" in step S31), the playback device acquires a gradation color management table in the index use continuation period (step S32) and proceeds to the loop of steps S33 to S36.

In this loop, the following processing steps are repeated. First, the playback device judges whether the current PTS is the start time of the $i^{th}$ character-string display instruction information (step S33). When judging that the current PTS is the start time, the playback device acquires the $i^{th}$ display update information of the $i^{th}$ character-string display instruction information (step S34). Then, the playback device performs gradation character rendering processing (step S35), judges whether the current PTS is the Out_Time of the index use continuation period (step S36), and returns to step S33. When judging that the current PTS is the Out_Time of the index use continuation period, the playback device further judges whether playback has ended (step S37), and returns to step S31.

Figure 19:
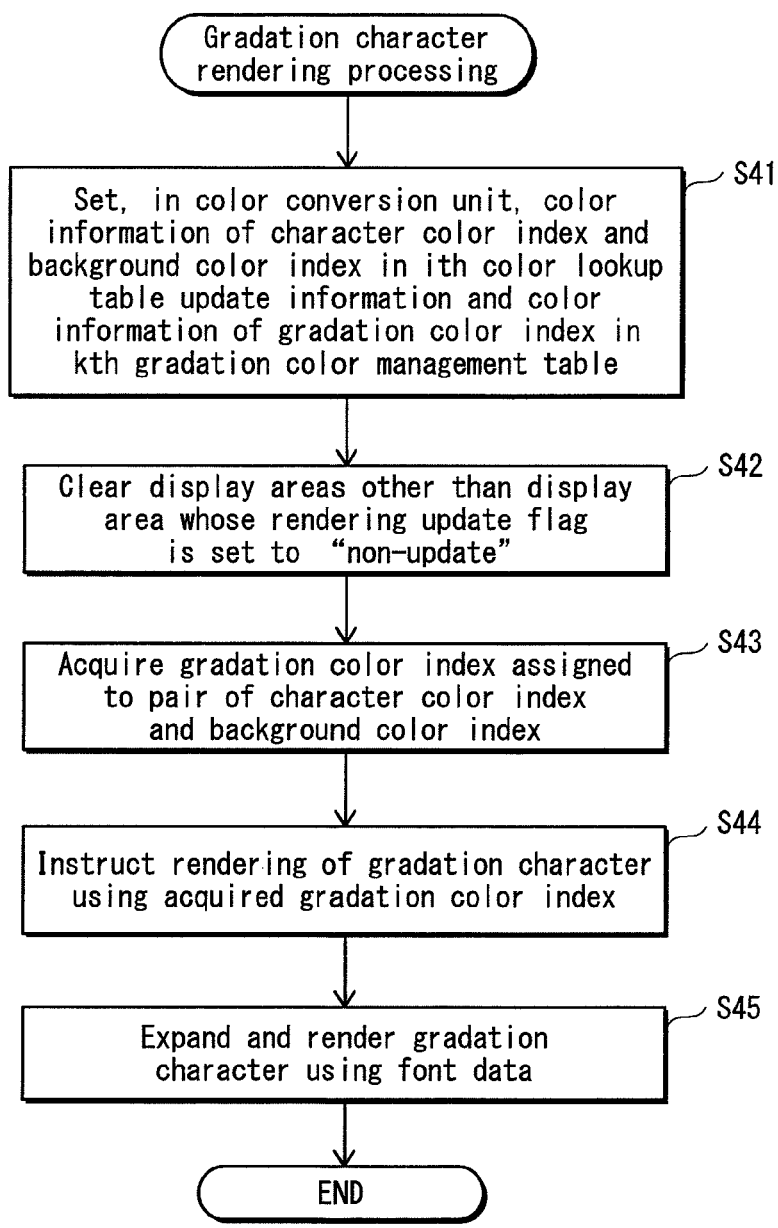
FIG. 19 is a flowchart showing steps of gradation character rendering processing.

FIG. 19 is a flowchart showing steps of gradation character rendering processing.

The color lookup table control unit 23 sets the following information in the color conversion unit 11: color information of a character color index and a background color index in the rendering update information in the character-string display instruction information; and color information of a gradation color index in the gradation color management table (step S41). Then, the color lookup table control unit 23 clears display areas other than a display area whose rendering update flag is set to "non-update" (step S42).

Subsequently, the rendering control unit 24 acquires a gradation dolor index assigned to a pair of a character color index and a background color index (step S43). The rendering control unit 24 instructs the rendering unit 25 to render a gradation character using the indexes of the character, background and gradation colors (step S44). The rendering unit 25 renders a background and a character string in the frame memory. When rendering a character string, the rendering unit 25 acquires font data from the font data storage unit 12. Then, the rendering unit 25 generates a gradation character image by expanding the font data, and renders a gradation character using the gradation color index designated by the rendering control unit 24 (step S45).

As described above, according to the present embodiment, the character-string display instruction information is pre-analyzed so as to display gradation characters with use of available indexes in the color lookup table. Pre-analyzing all pieces of character-string display instruction information may cause detriment. For example, the duration of time before initially displaying a character string may become longer. Also, indexes for gradation display may not be secured sufficiently due to a large number of used indexes or a large number of pairs of character color indexes and background color indexes. However, the aforementioned playback device avoids such detriment by dividing the range of pre-analysis by time points at which all display areas designated by the display area count are updated. In this way, a time period in which all the display areas are updated is set to be the range of pre-analysis, thus shortening the duration of time before initially displaying a character string. Also, since available indexes are searched for in a period in which the use of indexes is continuous, the number of available indexes is increased. This enables a high-speed gradation display using a large number of colors.

<Embodiment 2>

In Embodiment 1, the text subtitle decoder pre-analyzes a period in which the use of indexes is continuous, prior to the playback of a playlist. In the present embodiment, such pre-analysis is not performed. Instead, a gradation color is assigned to an available index in a color lookup table in real time. The following describes a playback device according to Embodiment 2, with reference to the drawings.

Figure 20:
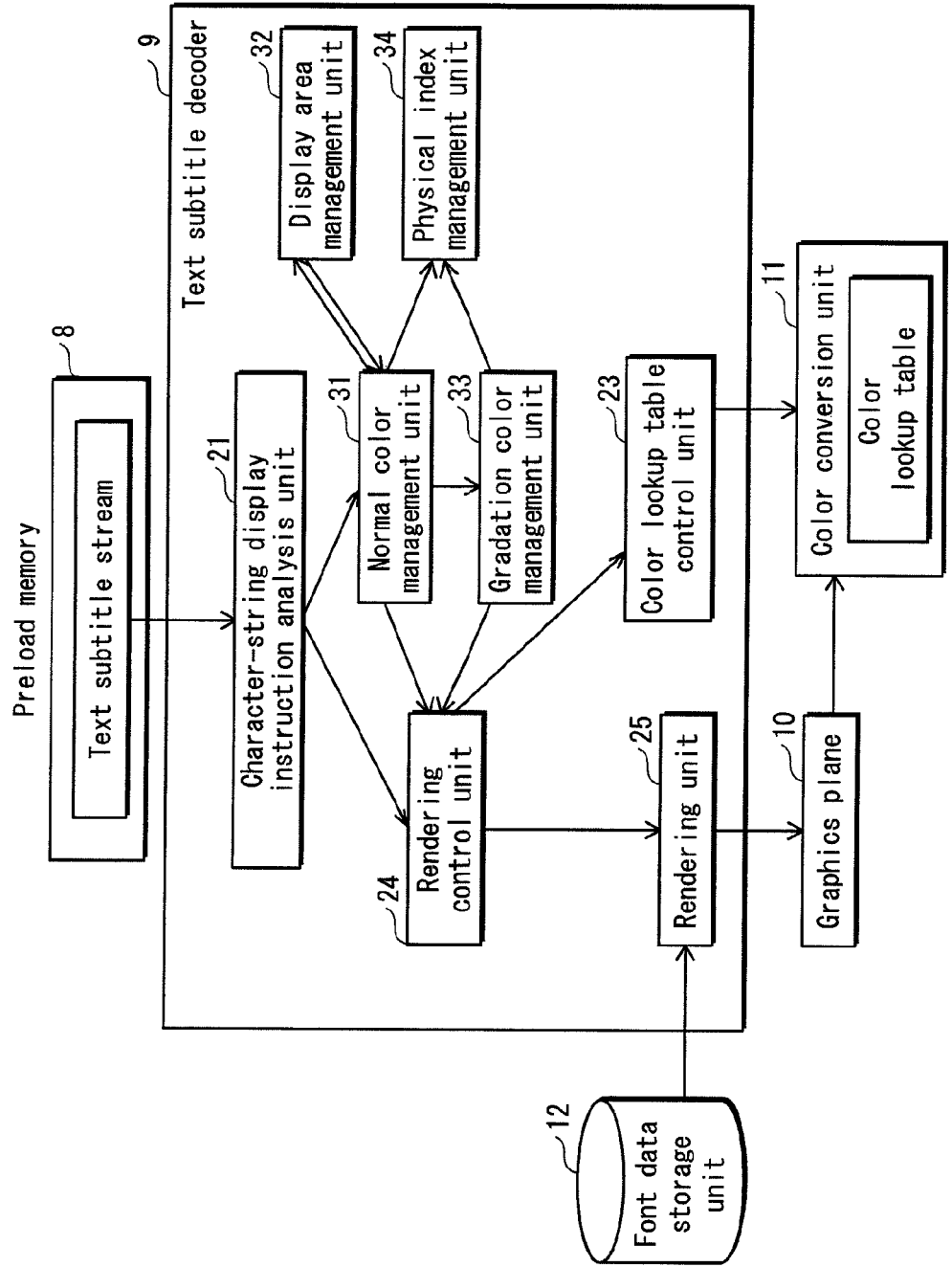
FIG. 20 is a block diagram showing a preload memory 8, a text subtitle decoder 9, a graphics plane 10, a conversion unit 11, and a font data storage unit 12, in Embodiment 2.

FIG. 20 is a block diagram showing the preload memory 8, the text subtitle decoder 9, the graphics plane 10, the conversion unit 11, and the font data storage unit 12, in Embodiment 2.

In the present embodiment, the same reference numbers are given to components that are the same as those in Embodiment 1, and detailed descriptions thereof are omitted.

Embodiment 2 is different from Embodiment 1 in that an improvement unique to Embodiment 2 is given to the character-string display instruction analysis unit 21, the color lookup table control unit 23, and the rendering control unit 24, and the pre-analysis unit 22 is removed. Instead, a normal color management unit 31, a display area management unit 32, a gradation color management unit 33, and a physical index management unit 34 are newly added.

<Improvement to Character-String Display Instruction Analysis Unit 21>

The character-string display instruction analysis unit 21 analyzes character-string display instruction information stored in the preload memory 8. Also, the character-string display instruction analysis unit 21 transmits, to the normal color management unit 31, a color lookup table update instruction written in the color lookup table update instruction information, at a time designated by time information. Further, the character-string display instruction analysis unit 21 transmits, to the rendering control unit 24, rendering update information written in the rendering update instruction information.

At the time of analysis, the character-string display instruction analysis unit 21 updates the color information of a designated index with use of a normal color management table.

<Newly Added Normal Color Management Unit 31>

The normal color management unit 31 has a normal color management table as shown in FIG. 21A, and updates the color information of an index designated by the character-string display instruction analysis unit 21. The normal color management table shows a relationship between pairs of indexes and pieces of color information, and physical indexes assigned to the pairs. Each physical index is assigned to a pair of index and color information by the physical index management unit 34 only when the pair is actually being used, so as to improve the use efficiency of the physical indexes.

FIG. 21A shows one example of the normal color management table. The normal color management table shows a relationship between pairs of indexes (0, 1, 2, 3 . . . ) and pieces of color information ((α0, r0, g0, b0) (α1, r1, g1, b1) (α2, r2, g2, b2) . . . ), and physical indexes (3, 8, 2, 4) assigned to the pairs. Each physical index is assigned to a pair of index and color information only when the pair is actually being used, so as to improve the use efficiency of the physical indexes.

<Newly Added Display Area Management Unit 32>

The display area management unit 32 manages pairs of character color indexes and background color indexes that are being used for each display area, with use of a display area management table as shown in FIG. 21B. The display area management unit 32 updates the display area management table as shown in FIG. 21B, every time the display is updated. The display area management table shows pairs of character color indexes (0, 2) and background color indexes (1, 3) that are being used in the respective areas (areas 1 and 2).

<Newly Added Gradation Color Management Unit 33>

The gradation color management unit 33 acquires the color information of an index from the normal color management unit 31, creates a gradation color management table with use of the color information of the index, and manages the gradation color management table. FIG. 21C is one example of a gradation color management table. The gradation color management table shows pairs ((0, 1)(2, 3) (4, 5)) of character color indexes and background color indexes, and physical indexes (10, 11, and 12) assigned to the pairs, and the color information ((α0, r0, g0, b0) (α1, r1, g1, b1)(α2, r2, g2, b2) . . . ) of the physical indexes. Each physical index is assigned, by the physical index management unit 34, to a pair of a character color index and a background color index in the rendering update information of the character-string display instruction information, only when the pair is actually being used for the subtitle display in a display area.

<Newly Added Physical Index Management Unit 34>

The physical index management unit 34 manages the use of physical indexes. Upon receiving a request of acquiring/releasing a physical index from the normal color management unit 31 or the gradation color management unit 33, the physical index management unit 34 acquires/releases the physical index in response to the request.

<Improvement to Color Lookup Table Control Unit 23>

The color lookup table control unit 23 creates a color lookup table as shown in FIG. 21D based on the normal color management table and the gradation color management table. The color lookup table shows a correspondence between physical indexes and color information. The color lookup table control unit 23 instructs the color lookup table setting unit 106 to update the color lookup table. In FIG. 21D, the color lookup table shows a correspondence between the physical indexes (0, 1, 2, 3 . . . ) and pieces of color information ((α0, r0, g0, b0) (α1, r1, g1, b1) (α2, r2, g2, b2) . . . ).

<Improvement to Rendering Control Unit 24>

The rendering control unit 24 instructs the rendering unit 25 to perform rendering in the frame memory, in accordance to an instruction from the character-string display instruction analysis unit 21. When giving the rendering instruction to the rendering unit 25, the rendering control unit 24 uses physical indexes. The rendering control unit 24 acquires character color physical indexes and background color physical indexes from the normal color management unit 31, and gradation color physical indexes from the gradation color management unit 33.

Figure 22:
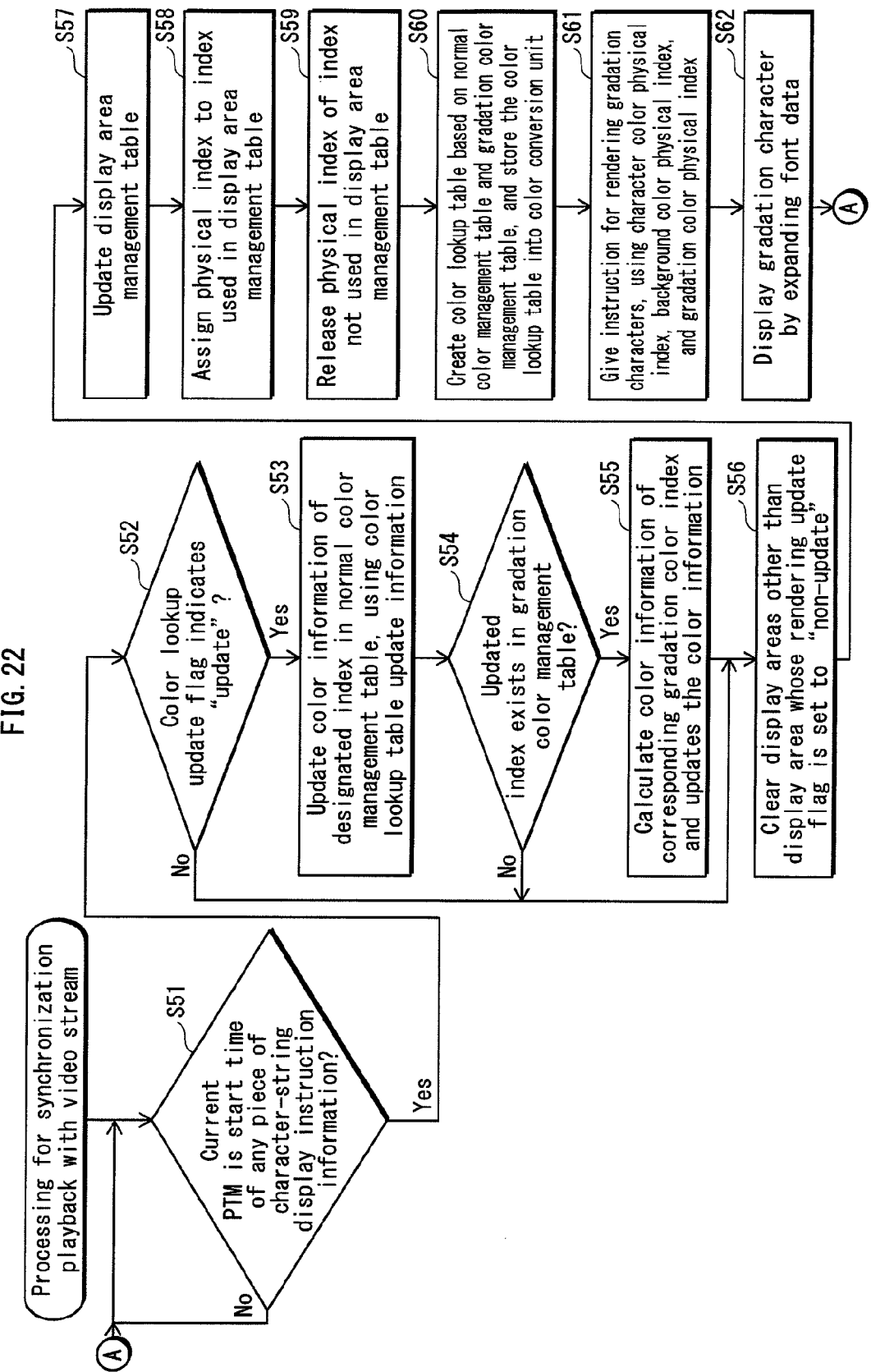
FIG. 22 is a flowchart showing processing steps of synchronization playback with a video stream in Embodiment 2.

The aforementioned components can be implemented in the playback device by describing, in a programming language, a built-in program for performing the processing steps of the flowchart of FIG. 22, instead of the processing steps of the flowchart of FIG. 18, and writing the program into the ROM of the playback device.

FIG. 22 shows a flowchart showing processing steps of synchronization playback with a video stream in Embodiment 2.

In step S51, the playback device judges whether the current PTS is the start time of any piece of character-string display instruction information. When judging that the current PTS is the start time of a piece of character-string display instruction information (hereinafter, the piece of character-string display instruction information is referred to as "i$^{th}$ character-string display instruction information"), the playback device judges whether the color lookup table is to be updated based on the color lookup table update flag in the i$^{th}$ character-string display instruction information (step S52). When judging that the color lookup table update flag is set to "update" ("Yes" in step S52), the playback device updates the color information of a designated index in the normal color management table, with use of the color lookup table update information (step S53).

In step S54, the playback device judges whether an updated index is any of the character color indexes and the background color indexes in the gradation color management table. When judging that the updated index is included in the gradation color management table, the playback device calculates color information of a corresponding gradation color index and updates the color information (step S55). When judging that the updated index is not included in the gradation color management table, the playback device skips step S55.

When judging that the color lookup table update flag is not set to "update" ("No" in step S52), the playback device skips steps S53 to S55, and the rendering control unit 24 clears display areas other than a display area whose rendering update flag is set to "non-update" (step S56).

Subsequently, the rendering control unit 24 updates the display area management table (step S57). Then, the rendering control unit 24 assigns a physical index to an index used in the display area management table (step S58), and releases a physical index assigned to an index not used in the display area management table (step S59).

The playback device creates the color lookup table based on the normal color management table and the gradation color management table, and stores the color lookup table into the color conversion unit 11 (step S60).

Then, the rendering control unit 24 instructs the rendering unit 25 to render a background and a character string. As for the rendering of the character string, the rendering control unit 24 instructs the rendering unit 25 to render a gradation character with use of a character color physical index, a background color physical index, and a gradation color physical index that are acquired from the gradation color management unit 33 (step S61). Upon receiving the instruction from the rendering control unit 24, the rendering unit 25 renders the background and the character string in the frame memory. When rendering the character string, the rendering unit 25 acquires font data from the font data storage unit 12 and generates a gradation character image. Then, the rendering unit 25 renders the gradation character with use of the gradation color physical index designated by the rendering control unit 24 (step S62).

As described above, the playback device according to Embodiment 2 stores a relationship between indexes designated by the character-string display instruction information in the text subtitle stream and physical indexes actually designated in the color conversion unit 11. Then, at the time of rendering, an index designated by the rendering update information of the character-string display instruction information in the text subtitle stream is converted into a physical index. This eliminates a situation where the indexes designated by the rendering update information are already assigned to gradation indexes.

The aforementioned structure enables the display of gradation characters with use of available indexes in the color lookup table. Also, the physical indexes are efficiently used by managing the display areas and assigning the physical indexes only when the indexes in the display areas are being used.

<Supplemental Remarks>

Although the above describes the best mode contemplated by the applicant of carrying out the present invention at the time of filing the present application, further improvements and modifications can be applied to the following technical aspects. It should be noted that whether to apply these improvements and modifications can be determined arbitrarily by a person who practices the invention.

<Analysis Range>

The analysis range of the pre-analysis unit 22 in Embodiment 1 may be longer than the range specified above. For example, the pre-analysis unit 22 may pre-analyze all pieces of character-string display instruction information.

<Assignment of Gradation Color Indexes and Color Information>

If the gradation color indexes and the color information do not need to be assigned at regular intervals, a value other than $2^n$ may be a threshold value.

<Number of Gradation Color Indexes>

The number of gradation color indexes in Embodiment 1 does not need to be the same for each pair of a character color and a background color.

<Timing of Releasing Physical Index>

In Embodiment 2, physical indexes not being used for display may be released at the timing when there are not enough physical indexes.

<Equipment of Style Sets>

The text subtitle stream preferably includes only one combination of an initial palette and a plurality of style sets applied to each display area. After the plurality of style sets are defined, only the IDs of the style sets are designated in the character-string display instruction information. In nature, subtitles are usually displayed by the same combination of styles. Because of this nature, the data size of the style sets can be reduced by use of the aforementioned IDs.

<Description of Rendering Update Information>

The designation of text codes and a character color in the rendering update information is realized by the description in a programming language. Therefore, the character-string display instruction analysis unit 21 preferably detects an index used for the character color from the following description.

The following is a description example of rendering update information for displaying a character string using a character color specified by an index, where the character string is composed of pieces of chara#data within a data length thereof. Whether to define a character string [STRING] or a character color [COLOR] is designated by data#type.

<Description Example>

```
total_length
while(processed_length < total_length) {
data_type
data_length
switch(data_type) {
case STRING;
[ chara_data × datalength]
break;
case COLOR;
[ index] ;
break;
}
}
```

<Implementation by Program Alone>

According to Embodiments 1 and 2 described above, the programs for executing the processing steps of FIGS. 15 to 19, and FIG. 22 are implemented as built-in programs in the playback devices. However, the programs for executing these processing steps of FIGS. 15 to 19, and FIG. 22 may be recorded on a computer-readable recording medium and provided for the playback devices as application programs. In the case of implementing such programs that cause a computer to execute the aforementioned processing steps as application programs, it is preferable that the application programs are developed as Java™ applications. This is because playback of a play list is enabled by a Java platform in a BD-ROM playback device.

An application executable on the platform of a BD-ROM playback device is referred to as "BD-J application".

The BD-J application is a Java™ application that is activated by application signaling whose life cycle is a title. The BD-J application is activated on a platform in which Java2 Micro_Edition (J2ME) Personal Basis Profile (PBP 1.0) and Globally Executable MHP specification (GEM1.0.2) for package media targets are fully mounted. The BD-J application instructs a Java™ virtual machine to generate a JMF (Java Media Frame work) player instance for playing back playlist information so as to start playback of a playlist. The JMF player instance is actual data generated in a heap memory of the virtual machine based on a JMF player class.

JMF A"BD://00001.mpls"; is a method for instructing the Java™ virtual machine to generate a player instance for playing back a play list containing a file "00001.mpls". A play is a method for instructing the JMF player instance to play back. The generation of the JMF player instance is performed based on a JMF library.

After generating the JMF instance, the Java™ virtual machine requires a WWW server to download an AV clip necessary for playing back the playlist. In downloading, a connection for acquiring the AV clip in the WWW server can be established by use of an openConnection method in a Java software library called "java.net". The use of the BD-J application provided from the BD-ROM enables gradation display in a text subtitle stream, even when a program for realizing the gradation display is not installed in the playback device.

(Implementation as Integrated Circuit)

The text subtitle decoder 9 may be configured as an integrated circuit such as a system LSI (Large Scale Integrated circuit) by being integrated on a single semiconductor substrate. A system LSI refers to a circuit formed by implementing a bare chip on a high-density substrate and packaging the bare chip. A system LSI also refers to a circuit formed by implementing a plurality of bare chips on a high-density substrate and packaging the bare chips, so that the bare chips look like one LSI from outside (such a system LSI is called a multi-chip module).

Here, there are two types of package for a system LSI, namely QFP (Quad Flat Package) and PGA (Pin Grid Array). A QFP is a system LSI in which pins are attached to the four-sides of the package. A PGA is a system LSI in which a majority of pins are attached to the bottom of the package.

These pins act as interfaces to other circuits. Since pins in a system LSI have a function as interfaces, the system LSI acts as the core of the playback device when the pins of the system LSI are connected to the other circuits.

The system LSI can be integrated into not only the playback device but also various apparatuses that playback video, such as a TV, a game console, a personal computer, and a one-seg mobile phone. The system LSI allows the playback device to be used for various purposes.

In the case of implementation as a system LSI, the following components may be packaged in one system LSI: the preload memory 8, the graphics plane 10, the conversion unit 11, and the font data storage unit 12. Also, the following components may be packaged in one system LSI: the read buffer 7, the filter 3, the transfer buffer 4, the video decoder 5, the audio decoder 15, the video plane 6, and the composition unit 13.

In a case where an elementary buffer, a video decoder, an audio decoder, and a graphics decoder are packaged in one system LSI, the architecture of the system LSI is preferably compliant with a Uniphier architecture.

The system LSI compliant with the Uniphier architecture is composed of the following circuit blocks.

Data Parallel Processor DPP

The data parallel processor DPP is an SIMD-type processor in which a plurality of element processors simultaneously perform the same operation. The data parallel processor DPP parallelizes decoding processing of a plurality of pixels that constitute a picture. Specifically, the parallelization is realized by causing computing units installed in the element processors to operate simultaneously by a single instruction.

Instruction Parallel Processor IPP

The instruction parallel processor IPP is composed of a local memory controller, a processing unit, and a virtual multi processor unit. The local memory controller includes an instruction RAM, an instruction cache, a data RAM, and a data cache. The processing unit includes an instruction fetch unit, a decoder, an execution unit, and a register file. The virtual multi processor unit causes the processing unit to simultaneously execute a plurality of applications.

CPU Block

The CPU block is composed of peripheral interfaces and peripheral interfaces. The peripheral circuits include an ARM core, an external bus interface (Bus Control Unit: BCU), a DMA controller, a timer, and a vector interrupt controller. The peripheral interfaces include a UART, a GPIO (General Purpose Input Output), and a synchronous serial interface.

Stream I/O Block

The stream I/O block performs data input/output with a drive device, a hard removable media drive device, an SD memory card drive device that are connected to external buses via a USB interface or an ATA Packet interface.

AV I/O Block

The AV I/O block is composed of an audio input/output, a video input/output, and an OSD controller, and performs data input/output with a TV and an AV amplifier.

Memory Control Block

The memory control block realizes reading and writing of an SDRAM connected via an external bus. The memory control block is composed of an internal bus connection unit, an access control unit, and an access schedule unit. The internal bus connection unit controls an internal connection between blocks. The access control unit performs data transfer with the SDRAM externally connected to the system LSI. The access schedule unit adjusts access requests from the blocks that request access to the SDRAM.

The following describes the details of a specific production procedure. First, a circuit diagram of a part to be a system LSI is drawn based on the block diagrams shown in the embodiments described above. Then, components in the block diagrams are embodied with use of circuit devices, ICs, and LSIs.

After the components are embodied, buses for connecting between the circuit devices, ICs, and LSIs, the peripheral circuits of the buses, an interface with an external entity, and such are specified. Furthermore, connection lines, power lines, ground lines, clock signal lines and such are specified. In this specification process, adjustments such as adjusting the operation timing of each component in view of the specifications of LSIs, guaranteeing a bandwidth required for each component are made, so that the circuit diagram is completed.

After the completion of the circuit diagram, implementation designing is performed. The implementation designing refers to a work for creating a substrate layout that determines where on the substrate to arrange the components (circuit devices, ICs and LSIs) in the circuit diagram created by circuit designing, and how to wire, on the substrate, the connection lines in the circuit diagram.

After the implementation designing is performed and the layout on the substrate is finalized, a result of the implementation designing is converted into CAM data, and the CAM data is output to appropriate devices such as an NC machine tool. The NC machine tool performs SoC (System on Chip) implementation or Sip (System in Package) implementation based on the CAM data. The SoC implementation is a technique for fusing a plurality of circuits to a single chip. The Sip implementation is a technique for forming a plurality of chips into a single package with use of resin or the like. Through the processes described above, a system LSI according to the present invention can be produced based on the internal structure diagram of the playback device in the embodiments described above.

<Equipment of Setting Register>

In order to suitably select a text subtitle stream, it is preferable for the playback device to include a setting register for storing a flag set and an authorization flag.

The flag set includes setting flags that each correspond to a different one of 3-byte language codes specified by ISO639-2/T. Each setting flag indicates the setting of a corresponding language code. Specifically, each setting flag indicates whether the playback device has a language capability of the corresponding language code. 3-byte language codes specified by ISO639-2/T include "ita" indicating Italian, "jpn" indicating Japanese, and "jav" indicating Javanese. The language codes specified by ISO639-2/T indicate 430 different languages by 3-byte codes, thus simplifying judgment as to whether the playback device has a language capability corresponding to each language code.

The capability corresponding to each language code includes the ability to realize a display method unique to a language corresponding to each code, by changing any of the followings: the arrangement of character bitmaps; the shape of character bitmaps; and the interval between character bitmaps.

In the beginning of Embodiment 1, a description is provided of the judgment as to whether the second condition is satisfied. This judgment is made by checking whether a setting flag that is one of the setting flags in the flag set and that corresponds to a language code of a text subtitle stream targeted for selection indicates that the playback device has the language capability of the language code.

The authorization flag indicates whether authorization is given for a selection of a text subtitle stream not satisfying the second condition.

When the authorization flag in the setting register indicates "authorized", a text subtitle stream satisfying the first and third conditions is targeted for selection, from among the text subtitle streams specified in the playlist information recorded on the recording medium.

INDUSTRIAL APPLICABILITY

A playback device according to the present invention displays high-quality character strings by means of gradation display, and thus is applicable to the industrial field of household apparatuses.

The invention claimed is:

1. A playback device for playing back a subtitle stream in synchronization with a video stream, the playback device comprising:
   a video decoder operable to decode the video stream;
   a subtitle decoder operable to decode the subtitle stream to obtain a bitmap of a subtitle; and
   a color conversion unit operable to convert bit values of the bitmap into display colors based on a color lookup table, the display colors including a character color, a background color, and one or more gradation colors for gradation between the character color and the background color, and the color lookup table including pieces of color information corresponding one-to-one to indexes of the bit values of the bitmap,
   wherein, prior to the conversion of the bit values of the bitmap into the display colors, the subtitle decoder:
   detects a period on a time axis of the video stream, in which a pair of (i) an index corresponding to a piece of color information of the character color and (ii) an index corresponding to a piece of color information of the background color is continuously used; and updates the color lookup table by assigning a piece of color information of each of the one or more gradation colors to one of the indexes other than the indexes used in the period, and wherein a number N of gradation colors used for the gradation in the period is calculated according to the following formula:

the number N of gradation colors=$(2^n-M)/$a number of pairs of character colors and background colors, where M represents a number of used indexes in the period and n represents a bit width of each index.

2. The playback device of claim 1, wherein the subtitle stream includes a plurality of display instructions, each of the display instructions (i) instructs the playback device to start a displaying of one or more characters, and (ii) includes time information indicating a display start time and a display end time of the one or more characters, and one or more rendering update flags each indicating whether to update at least one character displayed in a corresponding display area of a frame memory, the period is between the display start time of an $i^{th}$ display instruction and the display end time of a $j^{th}$ display instruction, the $i^{th}$ display instruction is an instruction in which all of the one or more rendering update flags are set to "update," and the $j^{th}$ display instruction is an instruction that is subsequent to the $i^{th}$ display instruction and is located immediately before a display instruction in which all of the one or more rendering update flags are set to "update."

3. The playback device of claim 2, wherein each of the display instructions further includes an index instruction indicating indexes used for the character color and the background color, and the used indexes are indexes that are assigned in accordance with index instructions included in the $i^{th}$ to the $j^{th}$ display instructions.

4. The playback device of claim 1, wherein a piece of color information of a gradation color n designated by an index k that takes a value from 1 to N−2 is calculated by the following formula:

the gradation color $n$ $(Ab+(Aa-Ab) \times k/(N31\ 1), Bb+(Ba-Bb) \times k/(N-1), Cb+(Ca-Cb) \times k/(N-1), Db+(Da-Db) \times k/(N-1))$, where a piece of color information of the character color in the period is (Aa, Ba, Ca, Da), and a piece of color information of the background color in the period is (Ab, Bb, Cb, Db).

5. The playback device of claim 1, wherein the subtitle decoder includes:

a pre-analysis unit operable to create a gradation color management table for managing the one or more gradation colors in correspondence with the character color and the background color in the period;

a color lookup table control unit operable to, after the creation of the gradation color management table, update the color lookup table and the gradation color management table; and a rendering unit operable to render at least one character in a frame memory with use of the gradation color management table, and wherein the subtitle includes the at least one character rendered by the rendering unit.

6. The playback device of claim 5, wherein the subtitle stream includes a plurality of display instructions, each of the display instructions includes a table update instruction that instructs the playback device to update the color lookup table at a display start time of the at least one character on the time axis of the video stream, the color lookup table control unit updates the gradation color management table and the color lookup table, based on a table update instruction in a display instruction that corresponds to a current playback time point of the video stream, and the conversion by the color conversion unit is performed with use of the color lookup table that has been updated by the color lookup table control unit.

7. An integrated circuit mountable in a playback device for playing back a subtitle stream in synchronization with a video stream, the integrated circuit comprising:

a video decoder operable to decode the video stream;

a subtitle decoder operable to decode the subtitle stream to obtain a bitmap of a subtitle; and a color conversion unit operable to convert bit values of the bitmap into display colors based on a color lookup table, the display colors including a character color, a background color, and one or more gradation colors for gradation between the character color and the background color, and the color lookup table including pieces of color information corresponding one-to-one to indexes of the bit values of the bitmap, wherein, prior to the conversion of the bit values of the bitmap into the display colors, the subtitle decoder:

detects a period on a time axis of the video stream, in which a pair of (i) an index corresponding to a piece of color information of the character color and (ii) an index corresponding to a piece of color information of the background color is continuously used; and updates the color lookup table by assigning a piece of color information of each of the one or more gradation colors to one of the indexes other than the indexes used in the period, and wherein a number N of gradation colors used for the gradation in the period is calculated according to the following formula:

the number N of gradation colors=$(2^n-M)/$a number of pairs of character colors and background colors, where M represents a number of used indexes in the period and n represents a bit width of each index.

8. A playback method for playing back a subtitle stream in synchronization with a video stream, the playback method comprising the steps of:

decoding the video stream;

decoding the subtitle stream to obtain a bitmap of a subtitle; and converting bit values of the bitmap into display colors based on a color lookup table, the display colors including a character color, a background color, and one or more gradation colors for gradation between the character color and the background color, and the color lookup table including pieces of color information corresponding one-to-one to indexes of the bit values of the bitmap, wherein, prior to the conversion of the bit values of the bitmap into the display colors, the step of decoding the subtitle stream to obtain the bitmap:
  detects a period on a time axis of the video stream, in which a pair of (i) an index corresponding to a piece of color information of the character color and (ii) an index corresponding to a piece of color information of the background color is continuously used; and
  updates the color lookup table by assigning a piece of color information of each of the one or more gradation colors to one of the indexes other than the indexes used in the period, and
wherein a number N of gradation colors used for the gradation in the period is calculated according to the following formula:

> the number $N$ of gradation colors=$(2^n-M)$/a number of pairs of character colors and background colors, where $M$ represents a number of used indexes in the period and $n$ represents a bit width of each index.

9. A non-transitory computer-readable recording medium having a program recorded thereon, the program for playing back a subtitle stream in synchronization with a video stream, and the program causing a computer to execute a playback method comprising the steps of:
  decoding the video stream;
  decoding the subtitle stream to obtain a bitmap of a subtitle; and
  converting bit values of the bitmap into display colors based on a color lookup table, the display colors including a character color, a background color, and one or more gradation colors for gradation between the character color and the background color, and the color lookup table including pieces of color information corresponding one-to-one to indexes of the bit values of the bitmap,
wherein, prior to the conversion of the bit values of the bitmap into the display colors, the step of decoding the subtitle stream to obtain the bitmap:
  detects a period on a time axis of the video stream, in which a pair of (i) an index corresponding to a piece of color information of the character color and (ii) an index corresponding to a piece of color information of the background color is continuously used; and
updates the color lookup table by assigning a piece of color information of each of the one or more gradation colors to one of the indexes other than the indexes used in the period, and
  wherein a number N of gradation colors used for the gradation in the period is calculated according to the following formula:

> the number $N$ of gradation colors=$(2^n-M)$/a number of pairs of character colors and background colors, where $M$ represents a number of used indexes in the period and $n$ represents a bit width of each index.

* * * * *